US012776872B2

(12) United States Patent
Khoshnevisan et al.

(10) Patent No.: US 12,776,872 B2
(45) Date of Patent: Oct. 27, 2026

(54) CHANNEL STATE INFORMATION REFERENCE SIGNAL (CSI-RS) RESOURCE ACTIVATION OR DEACTIVATION WITHIN A RESOURCE SET

(71) Applicant: QUALCOMM Incorporated, San Diego, CA (US)

(72) Inventors: Mostafa Khoshnevisan, San Diego, CA (US); Chenxi Hao, Beijing (CN); Yu Zhang, San Diego, CA (US); Xiaoxia Zhang, San Diego, CA (US); Wanshi Chen, San Diego, CA (US); Lei Xiao, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 701 days.

(21) Appl. No.: 18/042,591

(22) PCT Filed: Oct. 16, 2020

(86) PCT No.: PCT/CN2020/121381

§ 371 (c)(1),
(2) Date: Feb. 22, 2023

(87) PCT Pub. No.: WO2022/077414

PCT Pub. Date: Apr. 21, 2022

(65) Prior Publication Data

US 2023/0344578 A1 Oct. 26, 2023

(51) Int. Cl.
*H04L 5/00* (2006.01)
*H04W 24/10* (2009.01)

(52) U.S. Cl.
CPC .......... *H04L 5/0048* (2013.01); *H04W 24/10* (2013.01)

(58) Field of Classification Search
None
See application file for complete search history.

(56) References Cited

U.S. PATENT DOCUMENTS

2012/0201154 A1* 8/2012 Chandrasekhar ..... H04W 24/10 370/252
2014/0044040 A1* 2/2014 Chen ..................... H04L 5/0094 370/328

(Continued)

FOREIGN PATENT DOCUMENTS

CN 111587553 A 8/2020
EP 3471311 A1 * 4/2019 ........... H04L 5/0064

(Continued)

OTHER PUBLICATIONS

AT&T: "CSI Measurement for Dynamic BWP Switching", 3GPP Draft, 3GPP TSG RAN WG1 Meeting AH 1801, R1-1800580, Vancouver, Canada, Jan. 22-26, 2018, pp. 1-3.

(Continued)

*Primary Examiner* — Andrew C Oh
(74) *Attorney, Agent, or Firm* — Holland & Hart LLP / Qualcomm

(57) ABSTRACT

This disclosure provides systems, methods and apparatus for channel state information reference signal (CSI-RS) resource activation or deactivation within a resource set. In one aspect, a base station (BS) may transmit control signaling to a user equipment (UE) including an indication to switch an activity status of one or more CSI measurement resources within a CSI resource set from an activated state or a deactivated state to the other. The control signaling may include a bitmap indication for the activity status for the one or more CSI measurement resources or a CSI measurement resource identifier for each CSI measurement resource in an activated state. The UE may transmit a CSI report including information from measuring a channel state, a channel (Continued)

interference, or both for the one or more CSI measurement resources based on the activity status of each.

32 Claims, 12 Drawing Sheets

(56) References Cited

U.S. PATENT DOCUMENTS

| | | | | |
|---|---|---|---|---|
| 2016/0278073 | A1* | 9/2016 | Dinan | H04L 5/0057 |
| 2019/0215130 | A1* | 7/2019 | Aiba | H04L 5/005 |
| 2019/0223161 | A1* | 7/2019 | Muruganathan | H04L 5/0053 |
| 2021/0345148 | A1* | 11/2021 | Lin | H04L 5/001 |

FOREIGN PATENT DOCUMENTS

| | | | | | |
|---|---|---|---|---|---|
| ID | P202300848 | A | * | 1/2023 | |
| WO | WO-2014019168 | A1 | * | 2/2014 | H04L 5/0035 |
| WO | WO-2016018100 | A1 | * | 2/2016 | H04L 5/005 |
| WO | WO-2017128175 | | | 8/2017 | |
| WO | WO-2017128175 | A1 | * | 8/2017 | H04L 5/0026 |
| WO | WO-2018031727 | A1 | * | 2/2018 | H04L 5/0094 |
| WO | WO-2018107029 | A1 | * | 6/2018 | H04L 1/0026 |
| WO | WO-2019077749 | A1 | | 4/2019 | |
| WO | WO-2019138380 | A1 | * | 7/2019 | H04L 5/0053 |

OTHER PUBLICATIONS

Ericsson: "Corrections and Clarifications on CSI Measurements", 3GPP Draft, 3GPP TSG RAN WG1 Meeting #92, R1-1802741, Athens, Greece, Feb. 26-Mar. 2, 2018, 11 Pages, parts 2.1.1, 2.1.2.

International Search Report and Written Opinion—PCT/CN2020/121381—ISA/EPO—Jun. 25, 2021.

* cited by examiner

CHANNEL STATE INFORMATION REFERENCE SIGNAL (CSI-RS) RESOURCE ACTIVATION OR DEACTIVATION WITHIN A RESOURCE SET

CROSS REFERENCE

The present application is a 371 national stage filing of International PCT Application No. PCT/CN2020/121381 by KHOSHNEVISAN et al. entitled "CHANNEL STATE INFORMATION REFERENCE SIGNAL (CSI-RS) RESOURCE ACTIVATION OR DEACTIVATION WITHIN A RESOURCE SET," filed Oct. 16, 2020, which is assigned to the assignee hereof, and which is expressly incorporated by reference in its entirety herein.

TECHNICAL FIELD

This disclosure relates to wireless communications and to channel state information reference signal (CSI-RS) resource activation or deactivation within a resource set.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE) is described. In some implementations, the method can include receiving a configuration including one or more channel state information (CSI) measurement resources, each of the one or more CSI measurement resources having an activity status, receiving control signaling including an indication to switch the activity status of the one or more CSI measurement resources, and transmitting a report based on measuring a channel state or a channel interference, or both, according to the activity status of each of the one or more CSI measurement resources.

Another innovative aspect of the subject matter described in this disclosure can be implemented in an apparatus for wireless communication at an apparatus of a UE is described. The apparatus can include a processor, memory coupled with the processor, and instructions stored in the memory. The instructions may be executable by the processor to cause the apparatus to receive a configuration including one or more CSI measurement resources, each of the one or more CSI measurement resources having an activity status, receive control signaling including an indication to switch the activity status of the one or more CSI measurement resources, and transmit a report based on measuring a channel state or a channel interference, or both, according to the activity status of each of the one or more CSI measurement resources.

Another innovative aspect of the subject matter described in this disclosure can be implemented in an apparatus for wireless communication at an apparatus of a UE is described. The apparatus can include means for receiving a configuration including one or more CSI measurement resources, each of the one or more CSI measurement resources having an activity status, receiving control signaling including an indication to switch the activity status of the one or more CSI measurement resources, and transmitting a report based on measuring a channel state or a channel interference, or both, according to the activity status of each of the one or more CSI measurement resources.

Another innovative aspect of the subject matter described in this disclosure can be implemented in a non-transitory computer-readable medium storing code for wireless communication at an apparatus of a UE is described. The code can include instructions executable by a processor to receive a configuration including one or more CSI measurement resources, each of the one or more CSI measurement resources having an activity status, receive control signaling including an indication to switch the activity status of the one or more CSI measurement resources, and transmit a report based on measuring a channel state or a channel interference, or both, according to the activity status of each of the one or more CSI measurement resources.

In some implementations of the method, apparatuses, and non-transitory computer-readable medium described herein, receiving the control signaling may include operations, features, means, or instructions for receiving an indication of a CSI measurement resource bitmap including a bit for each of the one or more CSI measurement resources, where each bit corresponds to the activity status of each of the one or more CSI measurement resources.

In some implementations of the method, apparatuses, and non-transitory computer-readable medium described herein, receiving the control signaling may include operations, features, means, or instructions for receiving an indication of a CSI measurement resource identifier for each CSI measurement resource for which the activity status corresponds to an activated state.

Some implementations of the method, apparatuses, and non-transitory computer-readable medium described herein may further include operations, features, means, or instructions for switching the activity status of the one or more CSI measurement resources based on the control signaling, monitoring for one or more CSI-reference signal (CSI-RS) transmissions within a time period between switching the activity status of the one or more CSI measurement resources and a CSI reference resource, and selectively transmitting a second report based on the monitoring for the one or more CSI-RS transmissions.

Some implementations of the method, apparatuses, and non-transitory computer-readable medium described herein may further include operations, features, means, or instructions for receiving the one or more CSI-RS transmissions during the one or more CSI measurement resources, and transmitting the second report based on receiving the one or more CSI-RS transmissions.

Some implementations of the method, apparatuses, and non-transitory computer-readable medium described herein may further include operations, features, means, or instructions for dropping a transmission of the second report based on a failure to receive the one or more CSI-RS transmissions during the one or more CSI measurement resources.

Some implementations of the method, apparatuses, and non-transitory computer-readable medium described herein may further include operations, features, means, or instructions for transmitting the second report based on one or more previous CSI measurement resources and a failure to receive the one or more CSI-RS transmissions during the one or more CSI measurement resources.

In some implementations of the method, apparatuses, and non-transitory computer-readable medium described herein, receiving the control signaling may include operations, features, means, or instructions for receiving a message including an indication to perform a rate matching operation based on the activity status corresponding to the one or more CSI measurement resources.

Some implementations of the method, apparatuses, and non-transitory computer-readable medium described herein may further include operations, features, means, or instructions for performing the rate matching operation based on each CSI measurement resource of the one or more CSI measurement resources for which the activity status corresponds to an activated state.

Some implementations of the method, apparatuses, and non-transitory computer-readable medium described herein may further include operations, features, means, or instructions for performing the rate matching operation based on each CSI measurement resource of the one or more CSI measurement resources for which the activity status corresponds to an activated state and a deactivated state.

Some implementations of the method, apparatuses, and non-transitory computer-readable medium described herein may further include operations, features, means, or instructions for determining a number of CSI processing units (CPUs), or a number of active CSI measurement resources, or a number of active CSI measurement ports, or a combination thereof, associated with the one or more CSI measurement resources for which the activity status corresponds to an activated state satisfy a threshold, and evaluating one or more CSI hypotheses of a set of CSI hypotheses corresponding to the one or more CSI measurement resources for which the activity status corresponds to an activated state based on the number of CPUs satisfying the threshold, or the number of active CSI measurement resources satisfying the threshold, or the number of active CSI measurement ports satisfying the threshold, or a combination thereof.

Some implementations of the method, apparatuses, and non-transitory computer-readable medium described herein may further include operations, features, means, or instructions for switching the activity status of a first portion of the one or more CSI measurement resources from an activated state to a deactivated state, and determining the number of CPUs, or the number of active CSI measurement resources, or the number of active CSI measurement ports, or a combination thereof based at least on a second portion of the one or more CSI measurement resources, where the first portion of the one or more CSI measurement resources may be different from the second portion of the one or more CSI measurement resources.

Some implementations of the method, apparatuses, and non-transitory computer-readable medium described herein may further include operations, features, means, or instructions for switching the activity status of the one or more CSI measurement resources based on the control signaling.

Some implementations of the method, apparatuses, and non-transitory computer-readable medium described herein may further include operations, features, means, or instructions for switching the activity status of the one or more CSI measurement resources from one of an activated state or a deactivated state to the other activated state or the deactivated state according to the indication.

Some implementations of the method, apparatuses, and non-transitory computer-readable medium described herein may further include operations, features, means, or instructions for switching the activity status of one or more CSI-interference measurement (CSI-IM) resources based on switching the activity status of one or more non-zero power (NZP) CSI measurement resources.

Some implementations of the method, apparatuses, and non-transitory computer-readable medium described herein may further include operations, features, means, or instructions for switching the activity status of the one or more CSI measurement resources associated with a second set of CSI measurements resources based on the indication.

Some implementations of the method, apparatuses, and non-transitory computer-readable medium described herein may further include operations, features, means, or instructions for switching the activity status of one or more CSI measurement resources based on a number of activated port groups and the indication.

Some implementations of the method, apparatuses, and non-transitory computer-readable medium described herein may further include operations, features, means, or instructions for switching the activity status of a pair of CSI measurement resources based on the indication.

Another innovative aspect of the subject matter described in this disclosure can be implemented in a method of wireless communication at an apparatus of a base station (BS) is described. In some implementations, the method can include transmitting, to a UE, a configuration including one or more CSI measurement resources each of the one or more CSI measurement resources having an activity status, transmitting, to the UE, control signaling including an indication to switch the activity status of the one or more CSI measurement resources, and receiving, in response to the control signaling, a report based on a measured channel state or a measured channel interference, or both, according to the activity status of each of the one or more CSI measurement resources.

Another innovative aspect of the subject matter described in this disclosure can be implemented in an apparatus for wireless communication at an apparatus of a BS is described. The apparatus can include a processor, memory coupled with the processor, and instructions stored in the memory. The instructions can be executable by the processor to cause the apparatus to transmit, to a UE, a configuration including one or more CSI measurement resources each of the one or more CSI measurement resources having an activity status, transmit, to the UE, control signaling including an indication to switch the activity status of the one or more CSI measurement resources, and receive, in response to the control signaling, a report based on a measured channel state or a measured channel interference, or both, according to the activity status of each of the one or more CSI measurement resources.

Another innovative aspect of the subject matter described in this disclosure can be implemented in an apparatus for wireless communication at an apparatus of a BS is described. The apparatus can include means for transmitting, to a UE, a configuration including one or more CSI measurement resources each of the one or more CSI measurement resources having an activity status, transmitting, to the UE, control signaling including an indication to switch the activity status of the one or more CSI measurement resources, and receiving, in response to the control signaling, a report based on a measured channel state or a measured channel interference, or both, according to the activity status of each of the one or more CSI measurement resources.

Another innovative aspect of the subject matter described in this disclosure can be implemented in a non-transitory computer-readable medium storing code for wireless communication at an apparatus of a BS is described. The code can include instructions executable by a processor to transmit, to a UE, a configuration including one or more CSI measurement resources each of the one or more CSI measurement resources having an activity status, transmit, to the UE, control signaling including an indication to switch the activity status of the one or more CSI measurement resources, and receive, in response to the control signaling, a report based on a measured channel state or a measured channel interference, or both, according to the activity status of each of the one or more CSI measurement resources.

In some implementations of the method, apparatuses, and non-transitory computer-readable medium described herein, transmitting the control signaling may include operations, features, means, or instructions for transmitting an indication of a CSI measurement resource bitmap including a bit for each of the one or more CSI measurement resources, where each bit corresponds to the activity status of each of the one or more CSI measurement resources.

In some implementations of the method, apparatuses, and non-transitory computer-readable medium described herein, transmitting the control signaling may include operations, features, means, or instructions for transmitting an indication of a CSI measurement resource identifier for each CSI measurement resource for which the activity status corresponds to an activated state.

Some implementations of the method, apparatuses, and non-transitory computer-readable medium described herein may further include operations, features, means, or instructions for transmitting second control signaling including a second indication to switch the activity status of a second one or more CSI measurement resources associated with the set of CSI hypotheses, transmitting a CSI-RS transmission during the second one or more CSI measurement resource, and receiving a second report based on transmitting the CSI-RS transmission.

In some implementations of the method, apparatuses, and non-transitory computer-readable medium described herein, transmitting the control signaling may include operations, features, means, or instructions for transmitting a message including an indication to perform a rate matching operation based on the activity status corresponding to the one or more CSI measurement resources.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
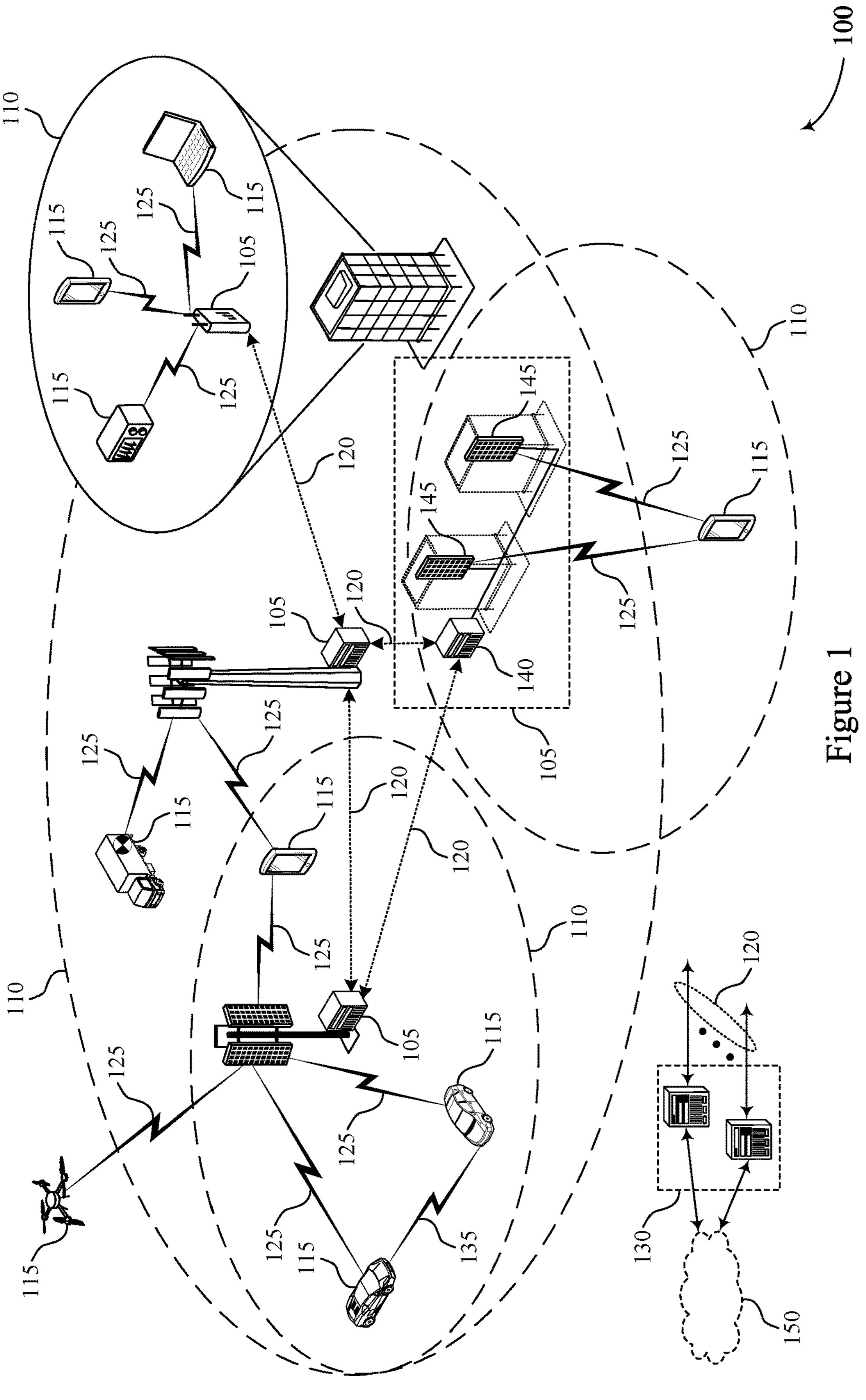
FIG. 1 illustrates an example of a wireless communications system that supports channel state information reference signal (CSI-RS) resource activation or deactivation within a resource set.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some wireless communications systems, a base station (BS) may configure a user equipment (UE) with a channel state information (CSI) report configuration for reporting a channel state or a channel interference measurement. The CSI report configuration may include one or more CSI measurement resources, such as CSI reference signal (CSI-RS) resources, with an activity status. In some cases, the BS may transmit signaling to the UE that activates or deactivates the one or more CSI measurement resources, or a portion of the one or more CSI measurement resources, within a CSI resource set. The signaling may be included in a medium access control-control element (MAC-CE), downlink control information (DCI), or the like. For example, the BS may determine one or more CSI measurement resources corresponding to a transmission reception point (TRP), a beam, a transmission configuration indicator (TCI) state, or the like within a CSI resource set may no longer be useful, or may no longer be useable by the network, for the UE. Similarly, the BS may determine one or more CSI measurement resources may be useful, or may be usable by the network, for the UE. Thus, the BS may transmit control signaling to switch the activity status of the CSI measurement resources. The control signaling may include a bitmap with a bit activity status indicator for each CSI measurement resource within the CSI resource set, a CSI measurement resource identifier for each activated CSI measurement resource, or the like.

In some examples, each CSI measurement resource within a CSI resource set may be referred to as a CSI hypothesis. Once the UE receives the control signaling, the UE may evaluate one or more CSI hypotheses for activated CSI measurement resources based on a number of CSI processing units (CPUs) satisfying a threshold, a number of active CSI measurement resources satisfying a threshold, a number of active CSI measurement ports satisfying a threshold, or a combination. The UE may switch the activity status of the one or more CSI measurement resources on a per CSI port group basis or based on the CSI measurement resources being paired in the case of a multi-TCI state CSI hypothesis. In some cases, the UE may implicitly switch the activity status of one or more CSI measurement resources in another CSI resource set based on switching the activity status of the one or more CSI measurement resources. The UE may monitor for one or more CSI-RS transmissions within a time period between switching the activity status of the one or more CSI measurement resources and a CSI reference resource. If the UE receives at least one CSI-RS transmission in the time period, the UE may transmit the CSI report. Otherwise, the UE may drop the CSI report or may not update the CSI report, such as by using previous CSI measurement resources for the CSI report. In some cases, a downlink shared channel may be rate matched around non-zero power (NZP) CSI measurement resources, such as in the case of periodic or semi-persistent CSI-RS resources. The BS may configure the UE to rate match based on the CSI measurement resources in an activated state or both in an activated state and a deactivated state.

Particular implementations of the subject matter described in this disclosure can be implemented to realize one or more of the following potential advantages. By supporting CSI measurement resource activation or deactivation based on control signaling, such as MAC-CE or DCI control signaling, a UE may accurately measure CSI according to updated activated CSI measurement resources. Implementing activity status evaluation techniques may allow the UE to switch the activity status of a CSI measurement resource from an activated state to a deactivated state, or from a deactivated state to an activated state, based on control signaling while maintaining a CSI report transmission. This may, in turn, reduce the processing overhead and latency involved in a UE measuring channel state or a channel interference and transmitting a report based on the measurements.

Further, by supporting switching the activity status of one or more CSI measurement resources, a UE may reduce the processing overhead involved in transmitting a CSI report to a BS, or the UE may reduce computation overhead involved in evaluating different CSI hypotheses such as spending the available computational capability on activated CSI measurement resources and avoid evaluating the deactivated CSI measurement resources, which can be controlled in a more dynamic way by the network. For example, the BS may transmit control signaling indicating to the UE to activate or deactivate one or more CSI measurement resources based on usefulness or usability of the CSI measurement resources for the CSI report. The UE may use the CSI measurement resources in an activated state to measure channel state or channel interference. The updated activity status may support reducing the processing overhead involved in the UE measuring one or more CSI measurement resources and transmitting the CSI report based on the measurements. Additionally, as the activity status of the CSI measurement resources may be switched more dynamically, CSI measurement resource overhead may be reduced. That is, the UE may activate more resources when they are deemed useful by the network. Additionally, or alternatively, some CSI measurement resources that may not be useful anymore may be dynamically deactivated by the network reducing the resource overhead.

FIG. 1 illustrates an example of a wireless communications system 100 that supports CSI-RS resource activation or deactivation within a resource set. The wireless communications system 100 may include one or more BSs 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The BSs 105 may be dispersed throughout a geographic area to form the wireless communications system 100 and may be devices in different forms or having different capabilities. The BSs 105 and the UEs 115 may wirelessly communicate via one or more communication links 125. Each BS 105 may provide a coverage area 110 over which the UEs 115 and the BS 105 may establish one or more communication links 125. The coverage area 110 may be an example of a geographic area over which a BS 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the BSs 105, or network equipment (such as core network nodes, relay devices, integrated access and backhaul (IAB) nodes, or other network equipment), as shown in FIG. 1.

The BSs 105 may communicate with the core network 130, or with one another, or both. For example, the BSs 105 may interface with the core network 130 through one or more backhaul links 120 (such as via an S1, N2, N3, or other interface). The BSs 105 may communicate with one another over the backhaul links 120 (such as via an X2, Xn, or other interface) either directly (such as directly between BSs 105), or indirectly (such as via core network 130), or both. In some examples, the backhaul links 120 may be or include one or more wireless links.

One or more of the BSs 105 described herein may include or may be referred to by a person having ordinary skill in the art as a base transceiver station, a radio BS, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the BSs 105 and the network equipment including macro eNBs or gNBs, small cell eNBs or gNBs, or relay BSs, among other examples, as shown in FIG. 1.

The UEs 115 and the BSs 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (such as in a carrier aggregation configuration), a carrier also may have acquisition signaling or control signaling that coordinates operations for other carriers. A carrier may be associated with a frequency channel (such as an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as of the same or a different radio access technology).

The communication links 125 shown in the wireless communications system 100 may include uplink transmissions from a UE 115 to a BS 105, or downlink transmissions from a BS 105 to a UE 115. Carriers may carry downlink or uplink communications (such as in an FDD mode) or may be configured to carry downlink and uplink communications (such as in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as 1.4, 3, 5, 10, 15, 20, 40, or 80 megahertz (MHz)). Devices of the wireless communications system 100 (such as the BSs 105, the UEs 115, or both) may have hardware configurations that support communications over a particular carrier bandwidth or may be configurable to support communications over one of a set of carrier bandwidths. In some examples, the wireless communications system 100 may include BSs 105 or UEs 115 that support simultaneous communications via carriers associated with multiple carrier bandwidths. In some examples, each served UE 115 may be configured for operating over portions (such as a sub-band, a BWP) or all of a carrier bandwidth.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the BSs 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple minislots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a BS 105 may be movable and therefore provide communication coverage for a moving geographic coverage area 110. In some examples, different geographic coverage areas 110 associated with different technologies may overlap, but the different geographic coverage areas 110 may be supported by the same BS 105. In other examples, the overlapping geographic coverage areas 110 associated with different technologies may be supported by different BSs 105. The wireless communications system 100 may include, for example, a heterogeneous network in which different types of the BSs 105 provide coverage for various geographic coverage areas 110 using the same or different radio access technologies.

Some UEs 115 may be configured to employ operating modes that reduce power consumption, such as half-duplex communications (such as a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a BS 105. Other UEs 115 in such a group may be outside the geographic coverage area 110 of a BS 105 or be otherwise unable to receive transmissions from a BS 105. In some examples, groups of the UEs 115 communicating via D2D communications may utilize a one-to-many (1:M) system in which each UE 115 transmits to every other UE 115 in the group. In some examples, a BS 105 facilitates the scheduling of resources for D2D communications. In other cases, D2D communications are carried out between the UEs 115 without the involvement of a BS 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the BSs 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a BS 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or BS 105 may be distributed across various network devices (such as radio heads and ANCs) or consolidated into a single network device (such as a BS 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some examples, the wireless communications system 100 may support millimeter wave (mmW) communications between the UEs 115 and the BSs 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the BSs 105 and the UEs 115 may employ carrier sensing for collision detection and avoidance. In some examples, operations in unlicensed bands may be based on a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A BS 105 or a UE 115 may be equipped with multiple antennas, which may be used to employ techniques such as transmit diversity, receive diversity, multiple-input multiple-output (MIMO) communications, or beamforming. The antennas of a BS 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some examples, antennas or antenna arrays associated with a BS 105 may be located in diverse geographic locations. A BS 105 may have an antenna array with a number of rows and columns of antenna ports that the BS 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The BSs 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a BS 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A BS 105 or a UE 115 may use beam sweeping techniques as part of beam forming operations. For example, a BS 105 may use multiple antennas or antenna arrays (such as antenna panels) to conduct beamforming operations for directional communications with a UE 115. Some signals (such as synchronization signals, reference signals, beam selection signals, or other control signals) may be transmitted by a BS 105 multiple times in different directions. For example, the BS 105 may transmit a signal according to different beamforming weight sets associated with different directions of transmission. Transmissions in different beam directions may be used to identify (such as by a transmitting device, such as a BS 105, or by a receiving device, such as a UE 115) a beam direction for later transmission or reception by the BS 105.

Some signals, such as data signals associated with a particular receiving device, may be transmitted by a BS 105 in a single beam direction (such as a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the BS 105 in different directions and may report to the BS 105 an indication of the signal that the UE 115 received with a highest signal quality or an otherwise acceptable signal quality.

In some examples, transmissions by a device (such as by a BS 105 or a UE 115) may be performed using multiple beam directions, and the device may use a combination of digital precoding or radio frequency beamforming to generate a combined beam for transmission (such as from a BS 105 to a UE 115). The UE 115 may report feedback that indicates precoding weights for one or more beam directions, and the feedback may correspond to a configured number of beams across a system bandwidth or one or more sub-bands. The BS 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a BS 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the BS 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined based on listening according to different receive configuration directions (such as a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a BS 105 or a core network 130 supporting radio bearers for user plane data. At the physical layer, transport channels may be mapped to physical channels.

The UEs 115 and the BSs 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as using a cyclic redundancy check (CRC)), forward error correction (FEC), and retransmission (such as automatic repeat request (ARQ)). HARQ may improve throughput at the MAC layer in poor radio conditions (such as low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a BS 105 may transmit a CSI report configuration to a UE 115 including one or more resource settings for CSI measurement resources. In some cases, each resource setting may have an active CSI resource set including one or more CSI measurement resources for a CSI report. The UE 115 may evaluate CSI for the one or more CSI measurement resources. Each CSI measurement resource may be referred to as a CSI hypothesis. In some examples, the UE 115 may no longer evaluate a CSI measurement resource if the CSI measurement resource corresponds to a TRP, a beam, a TCI state, or the like that is no longer useful or usable by the network for the UE 115, such as if the TRP, the beam, the TCI state, or the like become weak or if the BS 105 scheduler assigns the TRP, the beam, the TCI state, or the like to another UE 115. Additionally, or alternatively, the UE 115 may benefit from including an additional CSI measurement resource to be evaluated as a CSI hypothesis within the CSI resource set. In some examples, the network may use the BS 105 to reconfigure the CSI resource set at the UE 115 using higher layer signaling, such as RRC signaling, or may use a different CSI resource set. However, using higher layer signaling to reconfigure the CSI resource set or dynamic signaling to activate or deactivate a CSI resource set may increase signaling latency, for example by using more CPUs, a relatively high number of active CSI measurement resources, a higher number of CSI ports, or a combination, and may not allow for fast activation or deactivation on a per CSI measurement resource basis.

In some cases, the BS 105 may transmit control signaling to the UE 115 including an indication to switch an activity status of one or more CSI measurement resources within a CSI resource set. The control signaling may be included in a MAC-CE, a DCI message, or the like and may indicate one or more CSI measurement resources for which to switch an activity status. In some cases, the control signaling may include a bitmap indication for the activity status for the one or more CSI measurement resources or a CSI measurement resource identifier for each CSI measurement resource in an activated state. In some examples, the one or more CSI measurement resources may include CSI-IM resources, CSI-SSB resources, or both. In some examples, the UE 115 may perform an operation to switch the activity status of the one or more CSI measurement resources from an activated state or a deactivated state to the other deactivated state or activated state, respectively. In some examples, the UE 115 may perform a rate matching operation around one or more CSI measurement resources. For example, the UE 115 may use activated and deactivated CSI measurement resources or may use the activated CSI measurement resources for PDSCH rate matching.

In some cases, the UE 115 may evaluate the CSI hypotheses for one or more CSI measurement resources within a CSI resource set in an activated state. The UE 115 may evaluate the one or more CSI measurement resources based on the number of CPUs satisfying a threshold, a number of active CSI measurement resources satisfying a threshold, a number of active CSI measurement ports satisfying a threshold, or a combination. In some cases, after the UE 115 applies the activity status switching operation, which may be a CSI measurement resource activation command, but before a CSI reference resource, the UE 115 may receive at least one CSI-RS transmission. In some cases, the UE 115 may transmit the CSI report based on receiving at least one CSI-RS transmission. In some other cases, the UE 115 may drop a transmission of the CSI report based on a failure to receive at least one CSI-RS transmission, for example, during the one or more CSI measurement resources. In some examples, the UE 115 may not update the CSI report if the UE 115 fails to receive at least one CSI-RS transmission.

Figure 2:
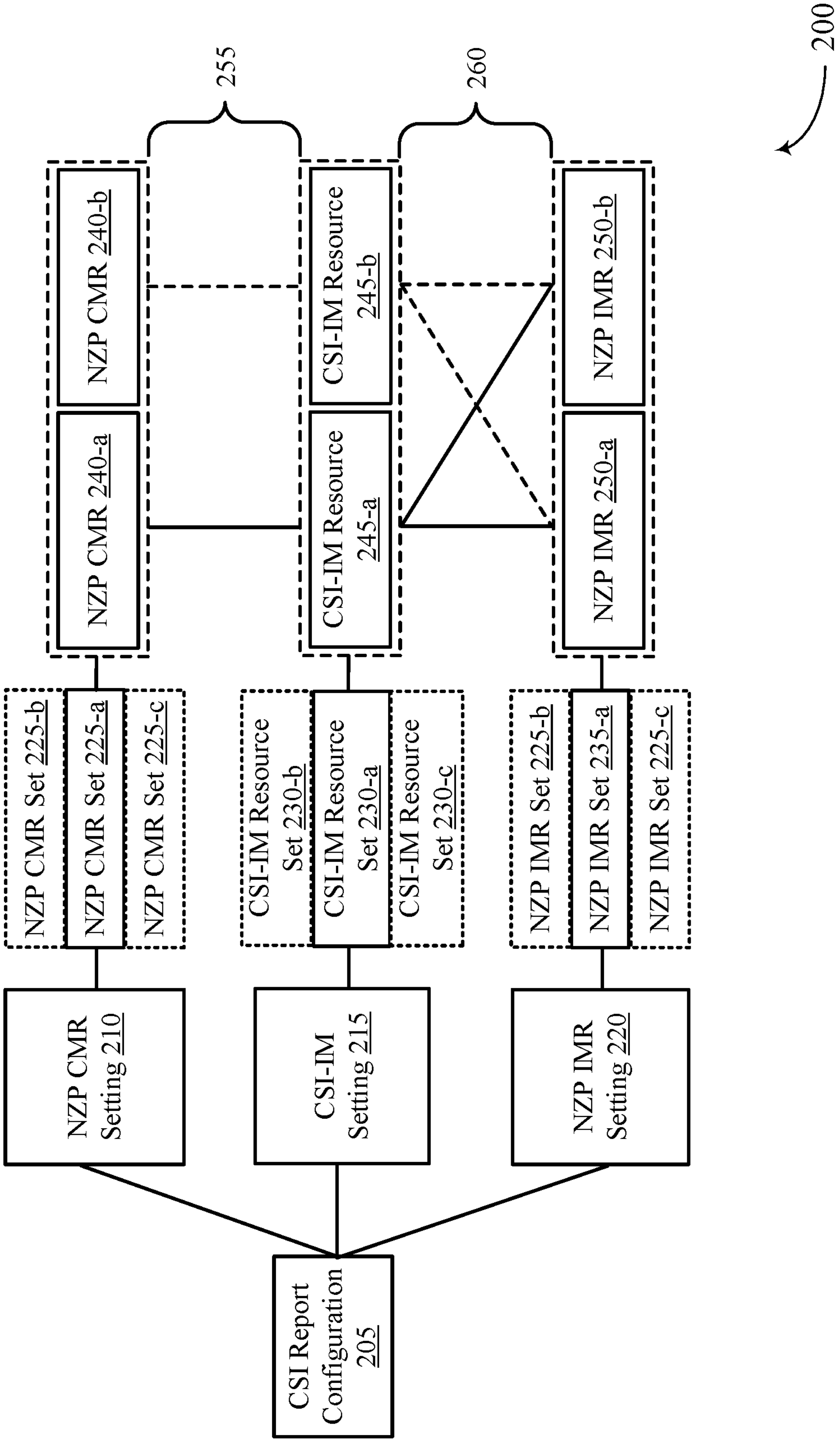
FIG. 2 illustrates an example of a report diagram that supports CSI-RS resource activation or deactivation within a resource set.

FIG. 2 illustrates an example of a report diagram 200 that supports CSI-RS resource activation or deactivation within a resource set. In some examples, the report diagram 200 may implement aspects of the wireless communications system 100. For example, the report diagram 200 may be implemented by a UE 115 and a BS 105 in a CSI reporting procedure, as described with reference to FIG. 1. The report diagram 200 may illustrate a process in which a UE 115 receives a CSI report configuration 205 from the network (such as from a BS 105) that may indicate one or more resources to use for a CSI measurement.

In some cases, a UE 115 may measure CSI for one or more potential signal paths, such as one or more communication links 125 as described with reference to FIG. 1. For example, the UE 115 may measure a CSI-RS and may use the measurements to perform channel estimation. The CSI-RS transmissions the UE 115 measures may be periodic CSI-RS transmissions, aperiodic CSI-RS transmissions, semi-persistent CSI-RS transmissions, or a combination. The UE 115 transmit a CSI report to a BS 105 including one or more parameters based on the CSI measurements. In some examples, the CSI report may include one or more precoding matrix indicators (PMIs), rank indicators (RIs), layer indicators (LIs), channel quality indicators (CQIs), reference signal received power (RSRP) measurements (such as Layer 1-RSRPs (L1-RSRPs)), signal to interference plus noise (SINR) measurements (such as L1-SINRs), or the like. In some examples, the UE 115 may perform periodic CSI reporting (such as the BS 105 may transmit higher layer signaling scheduling periodic CSI reports), aperiodic CSI reporting (such as the BS 105 may dynamically configure a CSI report), semi-persistent CSI reporting (such as the BS 105 may transmit higher layer signaling scheduling periodic CSI reports and may use dynamic signaling to trigger the periodic CSI reporting), or a combination.

In some examples, the UE 115 may receive a control message indicating the CSI report configuration 205 corresponding to one or more resources (such as CSI measurement resources) over which the UE 115 may monitor for two or more reference signals. For example, the UE 115 may receive the control message, such as RRC signaling, including the CSI report configuration 205 (which may be equivalently referred to as a "CSI report config") that may link to one or more resource settings associated with different measurement types. The CSI report configuration 205 may link to a setting for one or more of a non-zero power (NZP) CSI-RS resource for channel measurement (CMR) 210, a CSI-RS resource for interference measurement (CSIIM) 215, or an NZP CSI-RS for interference measurement (NZP IMR) 220, or any combination thereof. Each resource setting of the one or more resource settings to which the CSI report configuration 205 links may be associated with multiple resources sets, but one active resource set (such as only one active resource set).

The NZP CMR setting 210 may be associated with one or more NZP CMR sets 225. For example, an NZP CMR set 225-*a* may be the active resource set, while an NZP CMR set 225-*b* and an NZP CMR set 225-*c* may be inactive resource sets. Similarly, the CSI-IM resource setting 215 may be associated with one or more CSI-IM resource set 230. For example, a CSI-IM resource set 230-*a* may be the active resource set, while a CSI-IM resource set 230-*b* and a CSI-IM resource sets 230-*c* may be inactive resource sets. Similarly, the NZP IMR setting 220 may be associated with one or more NZP IMR sets 235. For example, an NZP IMR set 235-*a* may be the active resource set, while an NZP IMR set 235-*b* and an NZP IMR set 235-*c* may be inactive resource sets.

Each resource set may have one or more resources, which may be referred to as CSI-RS resources or CSI measurement resources. For example, the NZP CMR set 225-*a* may include one or more resources, such as one or more NZP CMRs 240 (such as an NZP CMR 240-*a* and an NZP CMR 240-*b*). In some aspects, the NZP CMR 240-*a* may be associated with a TCI state a (such as a first TCI state) and the NZP CMR 240-*b* may be associated with a TCI state b (such as a second TCI state). Similarly, the CSI-IM resource set 230-*a* may include one or more resources, such as one or more CSI-IM resources 245 (such as a CSI-IM resource 245-*a* and a CSI-IM resource 245-*b*). Similarly, the NZP IMR set 235-*a* may include one or more resources, such as one or more NZP IMRs 250 (such as an NZP IMR 250-*a* and an NZP IMR 250-*b*). In some examples, each CSI measurement resource within a resource set may be referred to as a CSI hypothesis.

In some examples, the UE 115 may select one NZP CMR 240 out of the one or more NZP CMRs 240 to use for reporting CSI. In such examples, the UE 115 may report the selected CMR 240 in a CSI-RS resource indicator (CRI) field as part of the CSI feedback so that a receiving TRP or a serving BS 105 knows to which NZP CMR 240 the reported CSI corresponds. Based on the selected NZP CMR 240, the UE 115 also may implicitly select a resource from the one or more CSI-IM resources 245 (such as the CSI-IM resource 245-*a* or the CSI-IM resource 245-*b*) and one or more NZP IMRs 250 (such as the NZP IMR 250-*a*, the NZP IMR 250-*b*, or both). For example, an NZP CMR 240 may feature a resource-wise association 255 with a CSI-IM resource 245, such that one NZP CMR 240 is associated with one CSI-IM resource 245. For example, the NZP CMR 240-*a* may be associated with the CSI-IM resource 245-*a* and the NZP CMR 240-*b* may be associated with the CSI-IM resource 245-*b*. Additionally, each NZP CMR 240 may feature a resource-wise association 260 with all NZP IMRs 250 collectively, such that the NZP CMR 240-*a* and the NZP CMR 240-*b* may both be associated with the NZP IMR 250-*a* and the NZP IMR 250-*b*.

In some cases, the CSI report configuration 205 may occupy one or more CPUs. The number of CPUs may be based on a report quantity. For example, when a report quantity is "none" and the BS 105 configures the CSI-RS resource set with higher layer parameters, the number of CPUs may be 0. When the report quantity is "CRI-RSRP," "SSB-Index-RSRP" (such as for a L1-RSRP report), or "none" (for a receive beam sweep), the number of CPUs may be 1. Additionally, or alternatively, the UE 115 may report a capability of a total number of CPUs as N for wideband CSI with up to four ports without CRI. Otherwise, the number of CPUs may be the number of CSI measurement resources within a CSI resource set, such as CSI-RS resources within a CSI-RS resource set, for a channel measurement. In some examples, the UE 115 may not be expected to update a remaining CSI if the total number of occupied CPUs exceeds the capability of the UE.

In some examples, a UE 115 may report a CSI port capability. The UE 115 may not have more active CSI ports, such as CSI-RS ports, or active CSI measurement resources, such as CSI-RS resources, than the reported capability. When a CSI measurement resource is associated with a number of CSI report configurations 205, the CSI measurement resource and the ports within the resource may be counted the number of times.

In some cases, the BS 105 may transmit control signaling to the UE 115 including an indication to switch an activity status of one or more CSI measurement resources within a CSI resource set, such as NZP CMRs 240, CSI-IM resources 245, NZP IMRs 250, or a combination. The control signaling may be included in dynamic signaling, such as a MAC-CE, a DCI message, or the like. The UE 115 may evaluate one or more CSI measurement resources based on the CSI report configuration 205 and the control signaling. For example, the UE 115 may evaluate the one or more CSI measurement resources according to the activity status for each of the one or more CSI measurement resources. The UE 115 may switch the activity status from an activated state to a deactivated state or from a deactivated state to an activated state based on the control signaling. The UE 115 may evaluate the CSI measurement resources in an activated state or the CSI measurement resources in an activated state or a deactivated state, for example, based on additional control signaling from the BS 105. In some examples, the UE 115 may transmit a CSI report including information from the evaluation, such as a channel state, a channel interference, or both.

Figure 3:
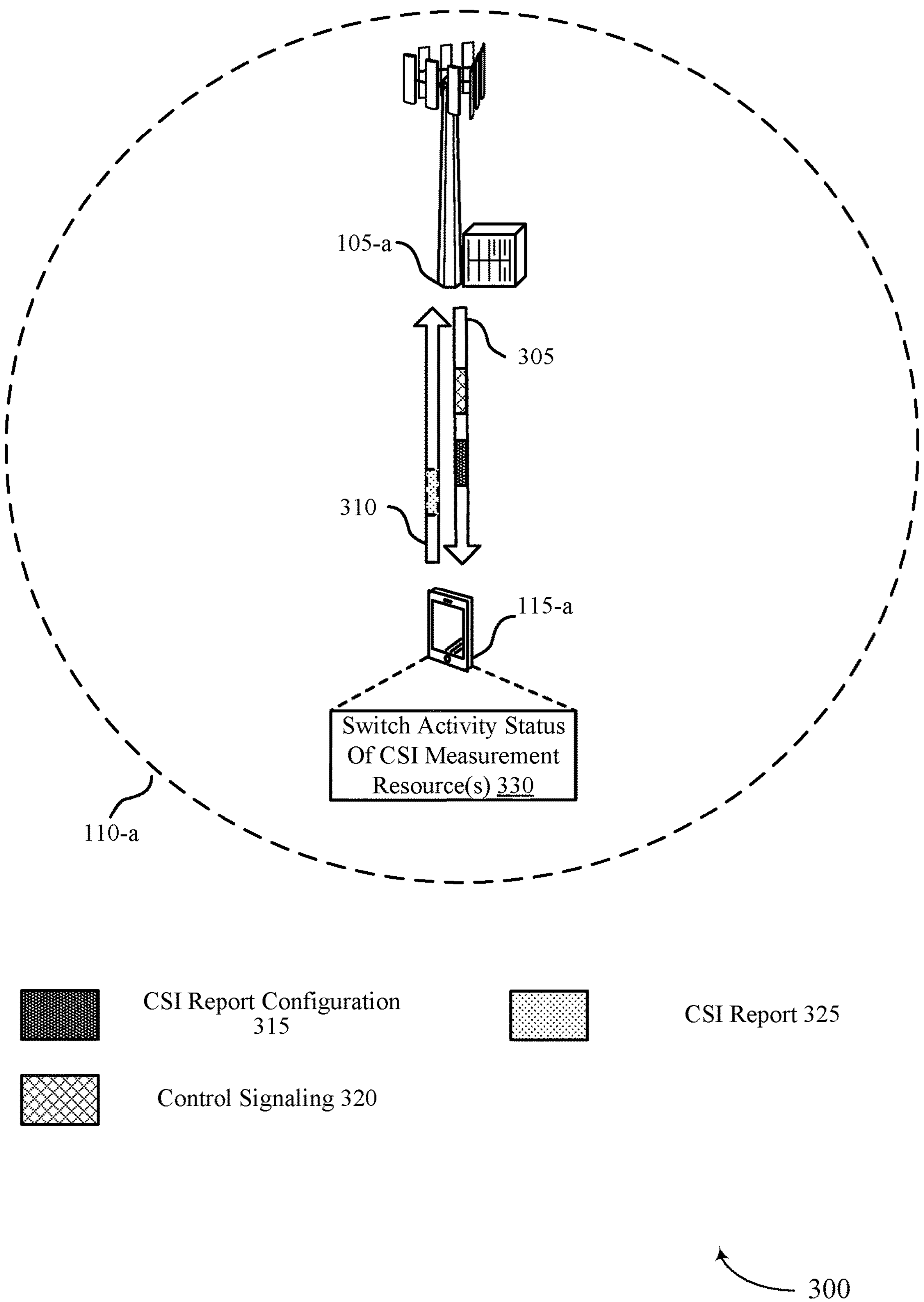
FIG. 3 illustrates an example of a wireless communications system that supports CSI-RS resource activation or deactivation within a resource set.

FIG. 3 illustrates an example of a wireless communications system 300 that supports CSI-RS resource activation or deactivation within a resource set. In some examples, wireless communications system 300 may implement aspects of wireless communications system 100 and may include UE 115-*a* and BS 105-*a* with coverage area 110-*a*, which may be examples of a UE 115 and a BS 105 with a coverage area 110 as described with reference to FIG. 1. In some examples, BS 105-*a* may communicate control signaling or data with a UE 115, such as UE 115 *a*, using a downlink communication link 305. Additionally, or alternatively, the UE 115 may communicate control signaling or data with the BS 105-*a* using an uplink communication link 310. In some cases, BS 105-*a* may transmit control signaling to UE 115-*a* with CSI report configuration 315 that indicates one or more CSI measurement resources for performing channel state or channel interference measurements. Base station 105-*a* may transmit control signaling 320 including an indication to switch an activity status for the one or more CSI measurement resources, or a portion of the one or more CSI measurement resources.

In some cases, a BS 105 may transmit a CSI report configuration 315, which may be an example of CSI report configuration 205, to a UE 115. For example, BS 105-*a* may transmit the CSI report configuration 315 to UE 115-*a* including one or more resource settings for CSI measurement resources (such as a CMR setting, a CSI-IM resource setting, an NZP IMR setting, or the like). In some cases, each resource setting may have an active CSI resource set including one or more CSI measurement resources for a CSI report 325. The CSI resource set, such as a CSI-RS resource set, may be periodically configured, semi-persistently configured, or aperiodically configured. The UE 115 may evaluate CSI for the one or more CSI measurement resources, which may belong to one or more CSI measurement resource sets, as described with reference to FIG. 2. Each CSI measurement resource may be referred to as a CSI hypothesis.

In some examples, the UE 115 may no longer evaluate one or more CSI measurement resources within a CSI resource set as a CSI hypothesis. For example, the UE 115 may no longer evaluate a CSI measurement resource if the CSI measurement resource corresponds to a TRP, a beam, a TCI state, or the like that is no longer useful or usable by the network for the UE 115, such as if the TRP, the beam, the TCI state, or the like become weak or if the BS 105 scheduler assigns the TRP, the beam, the TCI state, or the like to another UE 115. Additionally, or alternatively, the UE 115 may benefit from including an additional CSI measurement resource to be evaluated as a CSI hypothesis within the CSI resource set. In some examples, the network may use the BS 105 to reconfigure the CSI resource set at the UE 115 using higher layer signaling, such as RRC signaling, or may use a different CSI resource set. In some cases, such as for semi-persistent scheduling, the BS 105 may activate or deactivate a resource set using dynamic signaling. However, using higher layer signaling to reconfigure the CSI resource set or dynamic signaling to activate or deactivate a CSI resource set may increase signaling latency, for example by using more CPUs, a relatively high number of active CSI measurement resources, a higher number of CSI ports, or a combination, and may not allow for fast activation or deactivation on a per CSI measurement resource basis.

In some cases, BS 105-*a* may transmit control signaling 320 to UE 115-*a* including an indication to switch an activity status of one or more CSI measurement resources within a CSI resource set indicated in the CSI report configuration 315. The control signaling 320 may be included in dynamic signaling using downlink communication link 305, such as a MAC-CE, a DCI message, or the like and may indicate a CSI measurement resource identifier within which to switch the activity status of the one or more CSI measurement resources. The control signaling 320 also may include a serving cell identifier, a BWP identifier, or both for which the control signaling 320 applies. In some cases, the control signaling 320 may include a bitmap indication for the activity status for the one or more CSI measurement resources, which is described in further detail with respect to FIG. 4A. In some other cases, the control signaling 320 may include a CSI measurement resource identifier for each CSI measurement resource in an activated state, which is described in further detail with respect to FIG. 4B.

In some examples, the control signaling 320 may include a DCI message, such as a group common DCI message with DCI format 2_0. Base station 105-*a* may configure UE 115-*a* with a block in DCI format 2_0 that includes two or more fields to indicate the CSI measurement resource set identifier and one or more CSI measurement resources for which to switch an activity status. Additionally, or alternatively, the DCI message may include a bitmap indication of the activity status for one or more CSI measurement resources.

In some examples, the one or more CSI measurement resources may include CSI-IM resources, CSI-SSB resources, or both. For example, the control signaling 320 may include an indication to switch the activity status of one or more CSI-IM resources in a CSI-IM resource set. In some cases, the CSI-IM resource activation or deactivation within the CSI-IM resource set may be based on an NZP CSI activation or deactivation, for example, if there is a one-to-one mapping between CMR, which may be an NZP CSI, and a CSI-IM resource, as described with reference to FIG. 2. Similarly, the control signaling 320 may include an indication to switch the activity status of a CSI-SSB resource based on an SSB index within a CSI-SSB resource set.

In some examples, UE 115-*a* may perform an operation 330 to switch the activity status of one or more CSI measurement resources. For example, UE 115-*a* may switch one or more CSI measurement resources from an activated state or a deactivated state to the other deactivated state or activated state, respectively. In some cases, UE 115-*a* may implicitly switch the activity status of one or more CSI measurement resources within a CSI resource set based on switching the activity status of one or more CSI measurement resources within another CSI resource set. Additionally, or alternatively, UE 115-*a* may switch the activity status of one or more CSI measurement resources per CSI measurement resource independent of the CSI resource set. In some cases, once a CSI measurement resource activity status is switched, it may apply across CSI resource sets in which the CSI measurement resource is configured.

In some examples, UE 115-*a* may perform a rate matching operation around one or more CSI measurement resources. For periodic or semi-persistent reporting, a physical downlink shared channel (PDSCH) may be rate matched around NZP CSI resources. In some cases, UE 115-*a* may receive a message from BS 105-*a* to perform the rate matching operation. Base station 105-*a* may include the message in the control signaling 320 or may transmit the message via RRC signaling. The message may indicate which CSI measurement resources UE 115-*a* is to consider when rate matching. For example, UE 115-*a* may use activated and deactivated CSI measurement resources (except aperiodic CSI measurement resources). In some other examples, UE 115-*a* may use the activated CSI measurement resources for rate matching. The CSI measurement resource may not be considered for rate matching if it is deactivated in the CSI resources sets in which it is RRC configured. That is, a CSI measurement resource that is activated in one CSI resource set may be deactivated in another CSI resource set, thus may not be considered for rate matching. In some examples, UE 115-*a* may switch the activity status of the one or more measurement resources on a per CSI-RS port group basis, for paired CSI measurement resources, or both, which is described in further detail with respect to FIGS. 5A and 5B.

In some cases, UE 115-*a* may evaluate the CSI hypotheses for one or more CSI measurement resources within a CSI resource set in an activated state. For example, UE 115-*a* may determine a number of CPUs, a number of active CSI measurement resource ports, or both for the one or more CSI measurement resources satisfy a threshold. In some examples, the one or more activated CSI measurement resources within a CSI resource set may contribute to the number of occupied CPUs, the number of activated CSI measurement resources, the number of activated CSI ports, or a combination, while the deactivated CSI measurement resources within the set may not contribute to the number of occupied CPUs, the number of activated CSI measurement resources, the number of activated CSI ports, or a combination. UE 115-*a* may evaluate the one or more CSI measurement resources based on the number of CPUs satisfying the threshold, the number of active CSI measurement resource ports satisfying the threshold, or both. In some examples, the CSI report 325 for a CSI measurement resource may be RRC configured, such as for a periodic CSI report 325 on a physical uplink control channel (PUCCH). In some other examples, the CSI report 325 for a CSI measurement resource may be activated by dynamic signaling, such as a MAC-CE or a DCI message for a semi-persistent CSI report 325 on a PUCCH or a physical uplink shared channel (PUSCH), respectively. The CSI report 325 may be triggered by an aperiodic CSI trigger state indicated in a DCI message, such as for an aperiodic CSI report 325 on a PUSCH.

In some cases, after UE 115-*a* applies operation 330, which may be a CSI measurement resource activation command, but before a CSI reference resource, UE 115-*a* may receive at least one CSI-RS transmission. For example, UE 115-*a* may monitor for a CSI-RS transmission during one or more CSI measurement resources indicated in control signaling 320, such as during the one or more CSI measurement resources for which UE 115-*a* is to switch the activity status. In some cases, UE 115-*a* may transmit the CSI report 325 via uplink communication link 310 based on receiving at least one CSI-RS transmission. In some other cases, UE 115-*a* may drop a transmission of the CSI report 325 based on a failure to receive the CSI-RS transmissions, for example, during the one or more CSI measurement resources. In some examples, UE 115-*a* may use previous CSI-RS transmissions to transmit the CSI report 325 via uplink communication link 310. That is, UE 115-*a* may not update the CSI report 325 if UE 115-*a* fails to receive the CSI-RS transmissions.

Figure 4A:
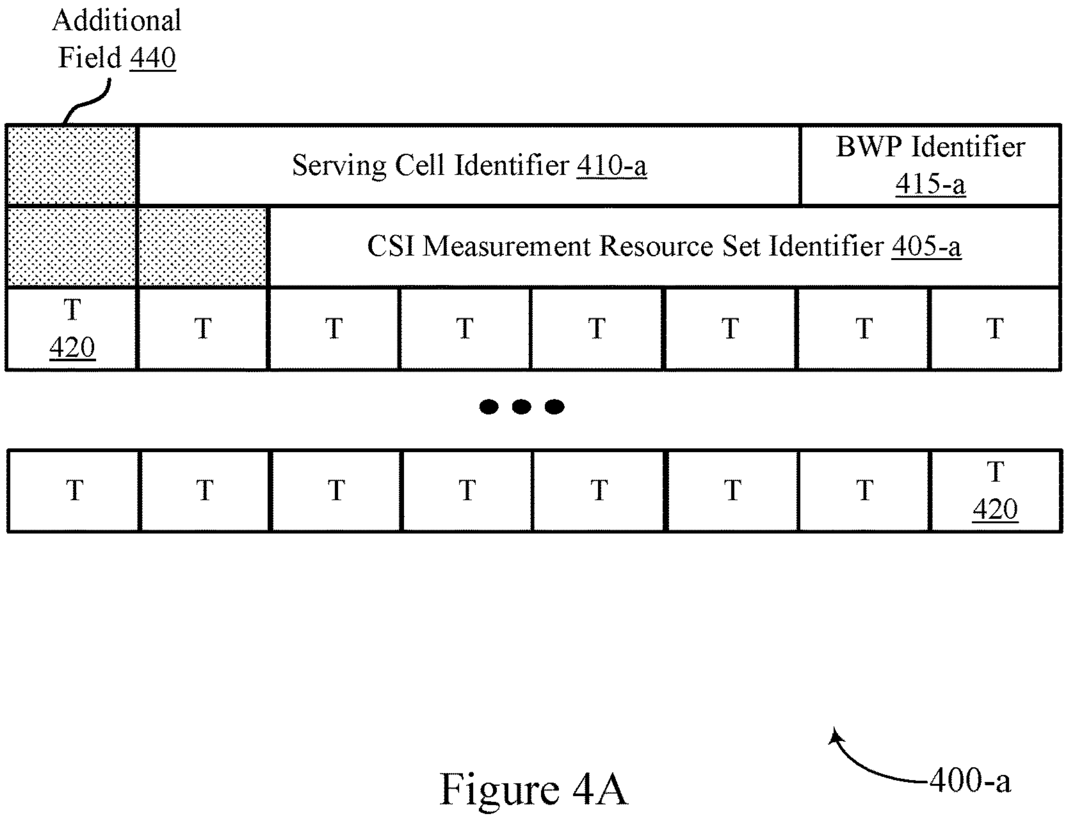
FIGS. 4A and 4B illustrate examples of control diagrams that support CSI-RS resource activation or deactivation within a resource set.
Figure 4B:
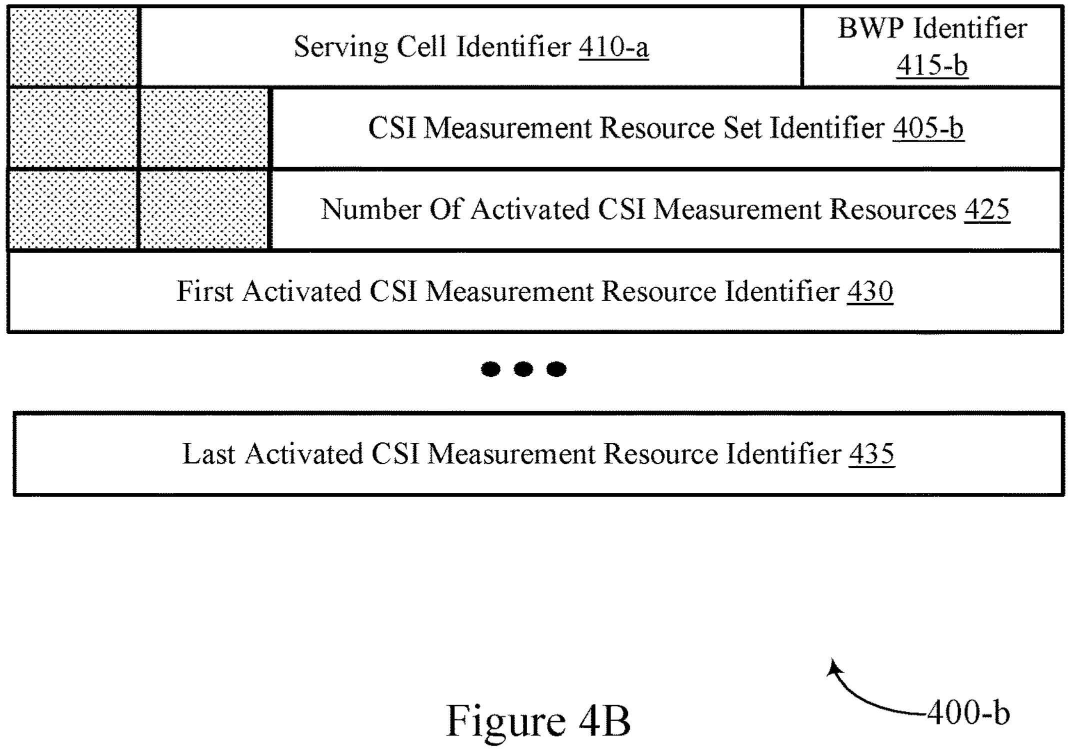

FIGS. 4A and 4B illustrates examples of control diagrams 400 that support CSI-RS resource activation or deactivation within a resource set. In some examples, control diagrams 400 may implement aspects of wireless communications system 100, report diagram 200, wireless communications system 300, or a combination. For example, the control diagrams 400 may be implemented by a UE 115 and a BS 105 in a CSI reporting procedure, as described with reference to FIGS. 1 through 3. The control diagram 400-*a* may illustrate a process in which a UE 115 receives a bitmap indication for the activity status for one or more CSI measurement resources. The control diagram 400-*b* may illustrate a process in which a UE 115 receives a CSI measurement resource identifier for each CSI measurement resource in an activated state.

In some cases, a BS 105 may transmit a CSI report configuration to a UE 115 including one or more resource settings for CSI measurement resources (such as a CMR setting, a CSI-IM resource setting, an NZP IMR setting, or the like), as described with reference to FIGS. 2 and 3. In some cases, each resource setting may have an active CSI resource set including one or more CSI measurement resources for a CSI report. The BS 105 may transmit control signaling to the UE 115 including an indication to switch an activity status of one or more CSI measurement resources within a CSI resource set. The control signaling may be included in dynamic signaling, such as a MAC-CE, a DCI message, or the like and may indicate a CSI measurement resource identifier 405, such as CSI measurement resource identifier 405-*a* and measurement resource identifier 405-*b*, within which to switch the activity status of the one or more CSI measurement resources. The control signaling also may include a serving cell identifier 410, such as serving cell identifier 410-*a* and serving cell identifier 410-*b*, a BWP identifier, such as BWP identifier 415-*a* and BWP identifier 415-*b*, or both for which the control signaling applies.

In some cases, as illustrated in control diagram 400-*a*, the control signaling may include a bitmap indication for the activity status for the one or more CSI measurement resources. For example, the bitmap may include a bit indicator 420, T, for each of the CSI measurement resources within a CSI resource set that are RRC configured. The bit indicator 420 may indicate whether the CSI measurement resource is activated or deactivated. The number of fields in the bitmap, $T_i$, may be equal to the number of RRC configured CSI measurement resources within the indicated CSI measurement resource set identifier 405-*a*.

In some other cases, as illustrated in control diagram 400-*b*, the control signaling may include a CSI measurement resource identifier for each CSI measurement resource in an activated state. For example, a field of the control signaling may include an indication of the number of activated CSI measurement resources 425. For example, the number of activated CSI measurement resources 425 may be less than or equal to 64. The control signaling may include a number of fields equal to the number of activated CSI measurement resources 425, each field indicating a CSI measurement resource identifier that is activated. For example, the control signaling may include a first activated CSI measurement resource identifier 430, a number of subsequent activated CSI measurement resource identifiers, and a last activated CSI measurement resource identifier 435. Thus, the CSI measurement resources within a CSI resource set are directly indicated in the control signaling, such as a MAC-CE, a DCI message, or the like. In some examples, the control signaling may include one or more additional fields 440.

Figure 5A:
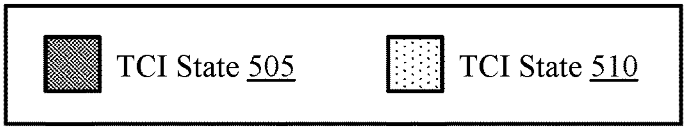
FIGS. 5A and 5B illustrate examples of resource schemes that support CSI-RS resource activation or deactivation within a resource set.
Figure 5A:
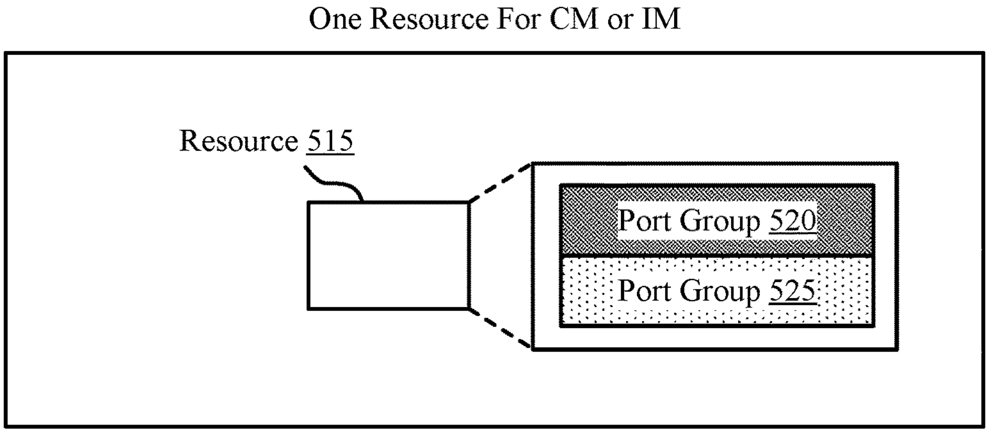
Figure 5B:
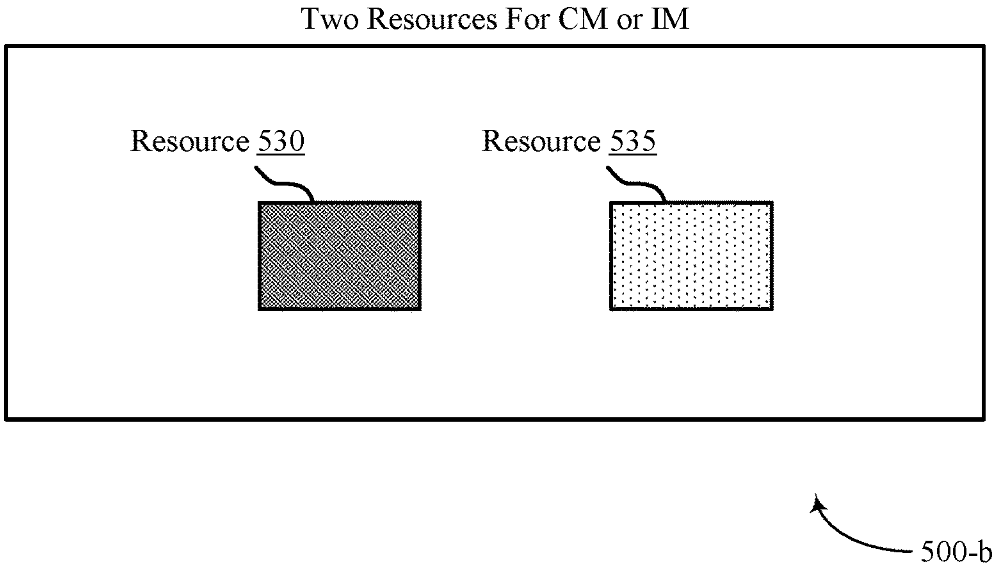

FIGS. 5A and 5B illustrate examples of resource schemes 500 that support CSI-RS resource activation or deactivation within a resource set. In some examples, the resource schemes 500 may be implemented to realize aspects of the wireless communications system 100, report diagram 200, the wireless communications system 300, control diagrams 400, or a combination, depicted and described in FIGS. 1-4, respectively. For example, multiple TRPs may transmit one or more reference signals (such as one or more CSI-RSs) to a UE 115 over a single CSI-RS resource associated with multiple port groups, each port group associated with a different TCI state, or over multiple CSI-RS resources, each CSI-RS resource associated with a different TCI state. In some implementations, the UE 115 may receive a control message activating or deactivating a resource (and a corresponding CSI hypothesis) on a CSI-RS port group basis, on a CSI-RS resource basis, or on a CSI-RS resource pair basis.

In some examples, for instance, the UE 115 may operate within a multi-TRP (mTRP) system and may receive joint transmissions from multiple TRPs. In some aspects, the UE 115 may receive a reference signal (such as a CSI-RS) from each of two TRPs that each apply a different TCI state. For example, the UE 115 may receive a first reference signal from a first TRP according to a TCI state 505 and may receive a second reference signal from a second TRP according to a TCI state 510. In such examples, the UE 115 may generate a CSI report, which also may be referred to as a multi-TRP or an mTRP CSI report, that includes CSI associated with more than one TCI state (for example, the TCI state 505 and the TCI state 510). In some examples, either of the two TRPs or the UE 115 may select a CSI hypothesis according to which the UE 115 is to generate the CSI report and each CSI hypothesis (and corresponding CSI report) may correspond to two or more TCI states (as opposed to a single TCI state). In some aspects, selecting the CSI hypothesis may include selecting the CSI hypothesis out of multiple TCI states, which may correspond to multiple CSI-RS resources in a resource set. Such CSI reporting may satisfy an objective of a further enhanced MIMO (FeMIMO) work item that is associated with beamforming and beam steering.

The first TRP and the second TRP may employ various approaches to jointly transmit reference signals to the UE 115 such that the UE 115 may generate the CSI report (a CSI report across the first TCI state and the second TCI state). For example, the first TRP and the second TRP may employ a first approach in which the two TRPs transmit reference signals over a single resource, such as a resource 515 as illustrated by the resource scheme 500. Alternatively, the first TRP and the second TRP may employ a second approach in which the two TRPs transmit reference signals over separate resources, such as a resource 530 and a resource 535 as illustrated by the resource scheme 501. In either approach, the UE 115 may use the resource or resources over which the multiple TRPs may transmit for channel measurement or interference measurement.

In the first approach, as illustrated by the resource scheme 500, the resource 515 may include multiple (such as two) CSI-RS port groups including a port group 520 and a port group 525 that are each associated with one TCI state. For example, the port group 520 may be associated with the TCI state 505 and the port group 525 may be associated with the TCI state 510. In other words, a first set of ports of the resource 515 (a CSI-RS resource) may have or otherwise be associated with the TCI state 505 and, as such, may be included within the port group 520. Similarly, a second set of ports of the resource 515 may have or otherwise be associated with the TCI state 510 and, as such, may be included within the port group 525. Accordingly, in the first approach, the first TRP applying the TCI state 505 and the second TRP applying the TCI state 510 may transmit reference signals over the resource 515 and the UE 115 may generate a CSI report based on receiving or measuring the reference signals received over the resource 515. Further, based on employing the first approach, a quantity of multi-TRP CSI hypotheses may be equal to a quantity of CSI-RS resources with multiple CSI-RS port groups.

In the second approach, as illustrated by the resource scheme 501, the resource 530 and the resource 535 may each be associated with a different TCI state. For example, the resource 530 may be associated with the TCI state 505 and the resource 535 may be associated with the TCI state 510. In some aspects, the resource 530 and the resource 535 may be linked as a resource pair (for example, a CSI-RS resource pair) and a CSI hypothesis may correspond to both of the resource 530 and the resource 535. In other words, the CSI hypothesis may correspond to the resource pair. As such, in the second approach, a quantity of multi-TRP CSI hypotheses may be equal to a quantity of CSI-RS resource pairs. Accordingly, in the second approach, the first TRP applying the TCI state 505 may transmit a reference signal over the resource 530 and the second TRP applying the TCI state 510 may transmit a reference signal over the resource 535 and the UE 115 may generate a CSI report based on receiving or measuring the reference signals received over the resource 530 and the resource 535. Details relating to the first approach and the second approach are further illustrated by Table 1, shown below.

TABLE 1

| | First Approach | Second Approach |
|---|---|---|
| # of CSI-RS resources for multi-TRP CSI hypothesis | 1 | 2 |
| # of TCI states per CSI-RS resource | 2 | 1 |
| Total # of multi-TRP CSI hypotheses | # of CSI-RS resources with two port groups | # of pairs of linked CSI-RS resources |

In some cases, a BS 105 may transmit a CSI report configuration to a UE 115 including one or more resource settings for CSI measurement resources (such as a CMR setting, a CSI-IM resource setting, an NZP IMR setting, or the like), as described with reference to FIGS. 2 and 3. In some cases, each resource setting may have an active CSI resource set including one or more CSI measurement resources for a CSI report. The BS 105 may transmit control signaling to the UE 115 including an indication to switch an activity status of one or more CSI measurement resources within a CSI resource set. The UE 115 may perform an operation to switch the activity status of the one or more CSI measurement resources within a CSI resource set from an activated state or a deactivated state to the other deactivated state or the activated state.

In some examples, the UE 115 may perform the operation on a per CSI port group basis. When the UE 115 is associated with one port group, or one TCI state, the UE 115 may receive control signaling, such as a MAC-CE, a DCI message, or the like, that activates or deactivates the one or more CSI measurement resources within the CSI resource set. When the UE 115 is associated with two port groups, or two TCI states, one of the port groups or both port groups may be activated or deactivated. If one of the port groups is activated, each CSI measurement resource may be for one TCI state, or one TRP, CSI hypothesis. Thus, the UE 115 may report a PMI, RI, LI, or a combination in the CSI report. If both port groups are activated, the CSI measurement resource may be for a multi-TCI state, or multi-TRP, CSI hypothesis. Thus, the UE 115 may report two PMIs, two RIs, Two LIs, or a combination in the CSI report.

In some cases, such as when the UE 115 has paired CSI measurement resources in a multi-TCI state CSI hypothesis, if one of the CSI measurement resources of the paired CSI measurement resources is activated and the other is deactivated, the multi-TCI state CSI hypothesis is assumed to be deactivated. Thus, the multi-TCI state CSI hypothesis may not be evaluated. The activated CSI measurement resource may still be for one TCI state CSI hypothesis, and the UE 115 may report one PMI, RI, LI, or a combination in the CSI report. If both CSI measurement resources of the paired CSI measurement resource are activated, the UE 115 may assume the multi-TCI state CSI hypothesis is activated. The UE 115 may evaluate the multi-TCI state CSI hypothesis and may report two PMIs, two RIs, two LIs, or a combination in the CSI report. In some examples, the pair of CSI measurement resources may be activated or deactivated based on the control signaling, such as a MAC-CE, a DCI message, or the like. When the pair of CSI measurement resources is deactivated, each individual CSI measurement resource among the pair of CSI measurement resource may still be active for one or two single-TRP CSI hypothesis.

Figure 6:
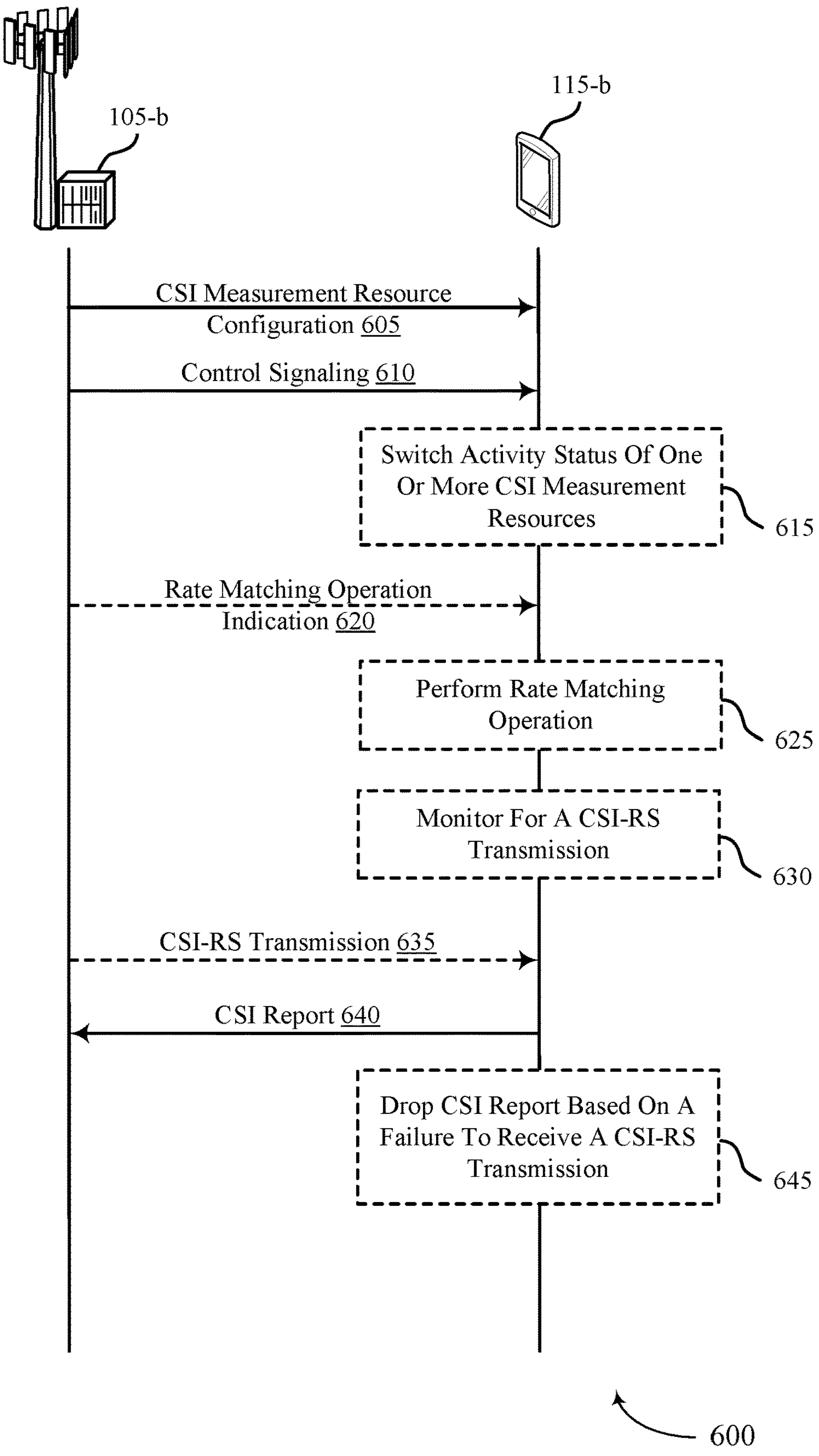
FIG. 6 illustrates an example of a process flow that supports CSI-RS resource activation or deactivation within a resource set.

FIG. 6 illustrates an example of a process flow 600 that supports CSI-RS resource activation or deactivation within a resource set. In some examples, process flow 600 may implement aspects of wireless communications system 100, report diagram 200, wireless communications system 300, control diagrams 400, resource schemes 500, or a combination, as depicted and described in FIGS. 1-5, respectively. The process flow 600 may illustrate an example of a BS 105 transmitting control signaling to a UE 115 including an indication to switch the activity status of one or more CSI measurement resources used for a CSI report. Alternative examples of the following may be implemented, where some processes are performed in a different order than described or are not performed. In some cases, processes may include additional features not mentioned below, or further processes may be added.

At 605, base station 105-*b* may transmit a CSI measurement resource configuration, which may be an example of a CSI report configuration as described with reference to FIG. 2, to UE 115-*b*. The CSI measurement resource configuration may include one or more CSI measurement resources, such as CSI-IM resources, CSI-SSB resources, or both. Each of the CSI measurement resources may have an activity status that indicates whether the CSI measurement resource is in an activated state or a deactivated state. In some examples, the one or more CSI measurement resources may be associated with a set of CSI hypotheses.

At 610, UE 115-*b* may receive control signaling from base station 105-*b*. The control signaling may be included in a MAC-CE, a DCI message, or the like. The control signaling may include an indication to switch the activity status of the one or more CSI measurement resources, or a portion of the one or more CSI measurement resources. In some cases, the control signaling may include an indication of a CSI measurement resource bitmap. The bitmap may include a bit indicating the activity status for each of the one or more CSI measurement resources. In some other cases, the control signaling may include an indication of a CSI measurement resource identifier for each CSI measurement resource in an activated state.

At 615, UE 115-*b* may switch the activity status of the one or more CSI measurement resources, or a portion of the CSI measurement resources, based on the control signaling. For example, UE 115-*b* may switch the activity status from an activated state to a deactivated state or from a deactivated state to an activated state. In some examples, UE 115-*b* may switch the activity status of one or more CSI-IM resources based on switching the activity status of one or more non-zero power NZP CSI measurement resources. In some cases, UE 115-*b* may switch the activity status of the one or more CSI measurement resources associated with another set of CSI measurement resources implicitly based on switching the one or more CSI measurement resources. UE 115-*b* may switch the activity status of the one or more CSI measurement resources based on a number of activated port groups and the indication. Additionally, or alternatively, UE

115-*b* may switch the activity status of a pair of CSI measurement resources based on the indication.

In some cases, UE 115-*b* may determine a number of CPUs, a number of active CSI measurement resource, a number of active CSI measurement ports, or a combination for the one or more CSI measurement resources in an activated state satisfy a threshold. UE 115-*b* may evaluate one or more CSI hypotheses of the set of CSI hypotheses for the one or more CSI measurement resources in an activated state based on the number of CPUs satisfying the threshold, the number of active CSI measurement resource ports satisfying the threshold, or both. In some examples, UE 115-*b* may switch the activity status of a first portion of the one or more CSI measurement resources from an activated state to a deactivated state. UE 115-*b* may determine the number of CPUs, the number of active CSI measurement resources, the number of active CSI measurement ports, or a combination based on a second portion of the one or more CSI measurement resources, where the first portion of the one or more CSI measurement resources is different from the second portion of the one or more CSI measurement resources.

At 620, UE 115-*b* may receive a message from base station 105-*b* including an indication to perform a rate matching operation based on the activity status of the one or more CSI measurement resources. For example, UE 115-*b* may perform the rate matching operation based on each CSI measurement resources in an activated state. In some other examples, UE 115-*b* may perform the rate matching operation based on CSI measurement resources in an activated state or a deactivated state. At 625, UE 115-*b* may perform the rate matching operation according to the message.

At 630, UE 115-*b* may switch the activity status of the one or more CSI measurement resources. In some cases, UE 115-*b* may monitor for one or more CSI-RS transmissions based on the control signaling or receiving additional control signaling indicating additional one or more CSI measurement resources. For example, UE 115-*b* may monitor for the CSI-RS transmissions within a time period between switching the activity status of the one or more CSI measurement resources and a CSI reference resource. UE 115-*b* may selectively transmit a report, or an additional report, based on the monitoring. For example, at 635, UE 115-*b* may receive at least one CSI-RS transmission during the time period or during the one or more CSI measurement resources.

At 640, UE 115-*b* may transmit a report, such as a CSI report, to base station 105-*b*. The CSI report may be based on UE 115-*b* measuring a channel state, a channel interference, or both according to the activity status of each of the one or more CSI measurement resources. In some cases, UE 115-*b* may transmit the report, or an additional report, based on receiving the at least one CSI-RS transmission during the one or more CSI measurement resources.

At 645, UE 115-*b* may drop a transmission of the CSI report, or an additional CSI report, based on a failure to receive the one or more CSI-RS transmissions at 635. In some examples, UE 115-*b* may transmit the CSI report, or the additional CSI report, based one on or more previous CSI measurement resources and the failure to receive the one or more CSI-RS transmissions at 635. That is, UE 115-*b* may not update the CSI-RS report.

Figure 7:
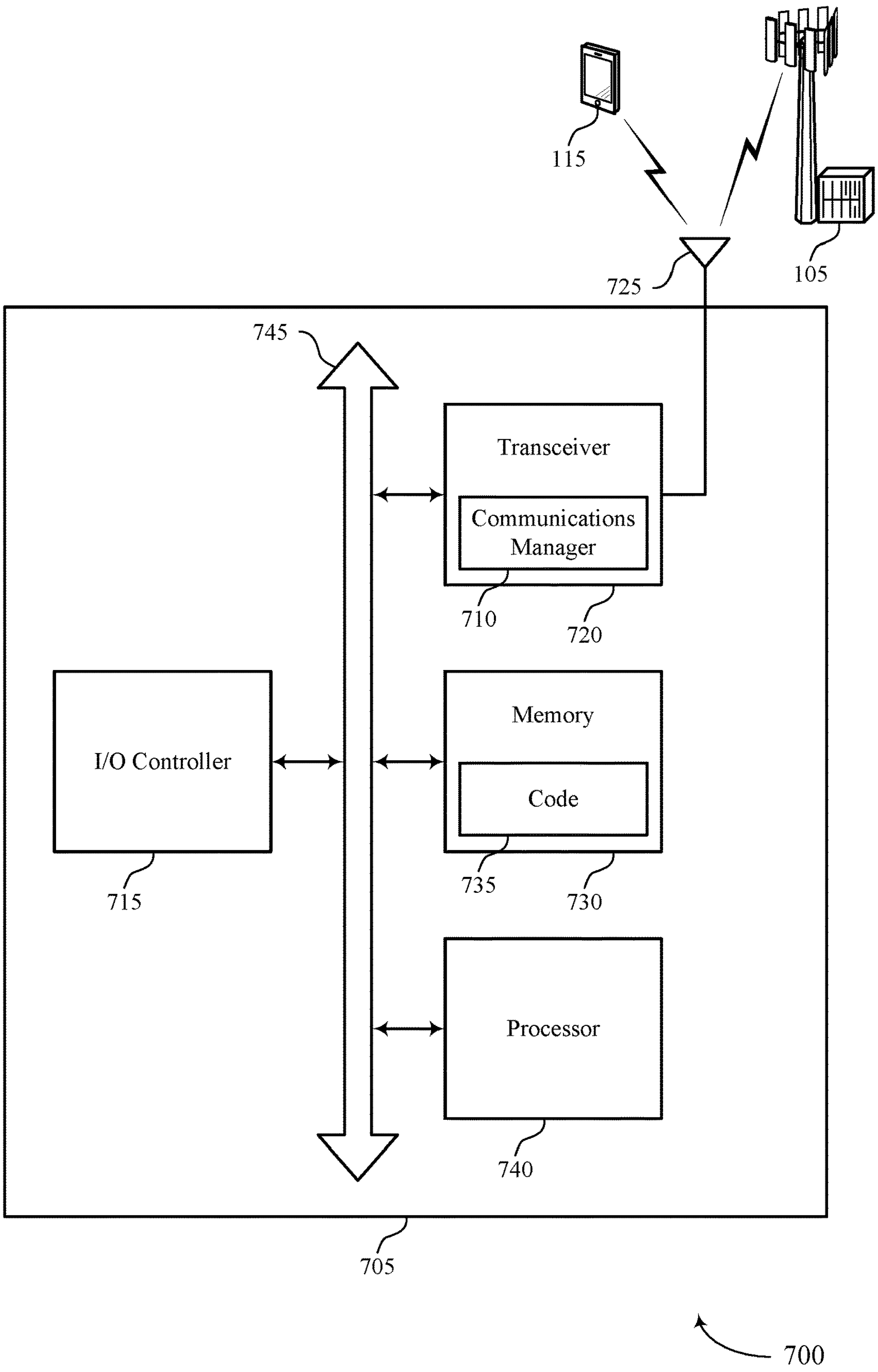
FIGS. 7 and 8 show block diagrams of example devices that support CSI-RS resource activation or deactivation within a resource set.

FIG. 7 shows a block diagram 700 of an example device 705 that supports CSI-RS resource activation or deactivation within a resource set. The device 705 may be an example of a UE 115. The device 705 may include components for bi-directional voice and data communications including components for transmitting and receiving communications, including a communications manager 710, an input/output (I/O) controller 715, a transceiver 720, an antenna 725, memory 730, and a processor 740. These components may be in electronic communication via one or more buses (such as a bus 745).

In some implementations, the communications manager 710 may receive a configuration including one or more CSI measurement resources, each of the one or more CSI measurement resources having an activity status. The communications manager 710 may receive control signaling including an indication to switch the activity status of the one or more CSI measurement resources and transmit a report based on measuring a channel state or a channel interference, or both, according to the activity status of each of the one or more CSI measurement resources.

The I/O controller 715 may manage input and output signals for the device 705. The I/O controller 715 also may manage peripherals not integrated into the device 705. In some examples, the I/O controller 715 may represent a physical connection or port to an external peripheral. In some examples, the I/O controller 715 may utilize an operating system such as iOS®, ANDROID®, MS-DOS®, MS-WINDOWS®, OS/2®, UNIX®, LINUX®, or another known operating system. In some other examples, the I/O controller 715 may represent or interact with a modem, a keyboard, a mouse, a touchscreen, or a similar device. In some examples, the I/O controller 715 may be implemented as part of a processor. In some implementations, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 also may include a modem to modulate the packets and provide the modulated packets to the antennas for transmission, and to demodulate packets received from the antennas.

In some examples, the wireless device may include a single antenna 725. However, in some other examples the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some examples, the memory 730 may contain, among other things, a basic I/O system (BIOS) which may control basic hardware or software operation such as the interaction with peripheral components or devices.

The processor 740 may include an intelligent hardware device (such as a general-purpose processor, a digital signal processor (DSP), a central processing unit, a microcontroller, an application-specific integrated circuit (ASIC), a field-programmable gate array (FPGA), a programmable logic device, a discrete gate or transistor logic component, a discrete hardware component, or any combination thereof). In some examples, the processor 740 may be configured to operate a memory array using a memory controller. In some other examples, a memory controller may be integrated into the processor 740. The processor 740 may be configured to execute computer-readable instructions stored in a memory 730 to cause the device 705 to perform various functions, such as functions or tasks supporting CSI-RS resource activation or deactivation within a resource set.

The code 735 may include instructions to implement aspects of the present disclosure, including instructions to support wireless communications. The code 735 may be stored in a non-transitory computer-readable medium such as system memory or other type of memory. In some implementations, the code 735 may not be directly executable by the processor 740 but may cause a computer (for example, when compiled and executed) to perform functions described herein.

In some implementations, processor 740 may be a component of a processing system. A processing system may generally refer to a system or series of machines or components that receives inputs and processes the inputs to produce a set of outputs (which may be passed to other systems or components of, for example, the UE 115). For example, a processing system of the UE 115 may refer to a system including the various other components or subcomponents of the UE 115.

The processing system of the UE 115 may interface with other components of the UE 115, and may process information received from other components (such as inputs or signals), output information to other components, etc. For example, a chip or modem of the UE 115 may include a processing system, a first interface to receive or obtain information, and a second interface to output, transmit or provide information. In some cases, the first interface may refer to an interface between the processing system of the chip or modem and a receiver, such that the UE 115 may receive information or signal inputs, and the information may be passed to the processing system. In some cases, the second interface may refer to an interface between the processing system of the chip or modem and a transmitter, such that the UE 115 may transmit information output from the chip or modem. A person having ordinary skill in the art will readily recognize that the second interface also may obtain or receive information or signal inputs, and the first interface also may output, transmit or provide information.

Figure 8:
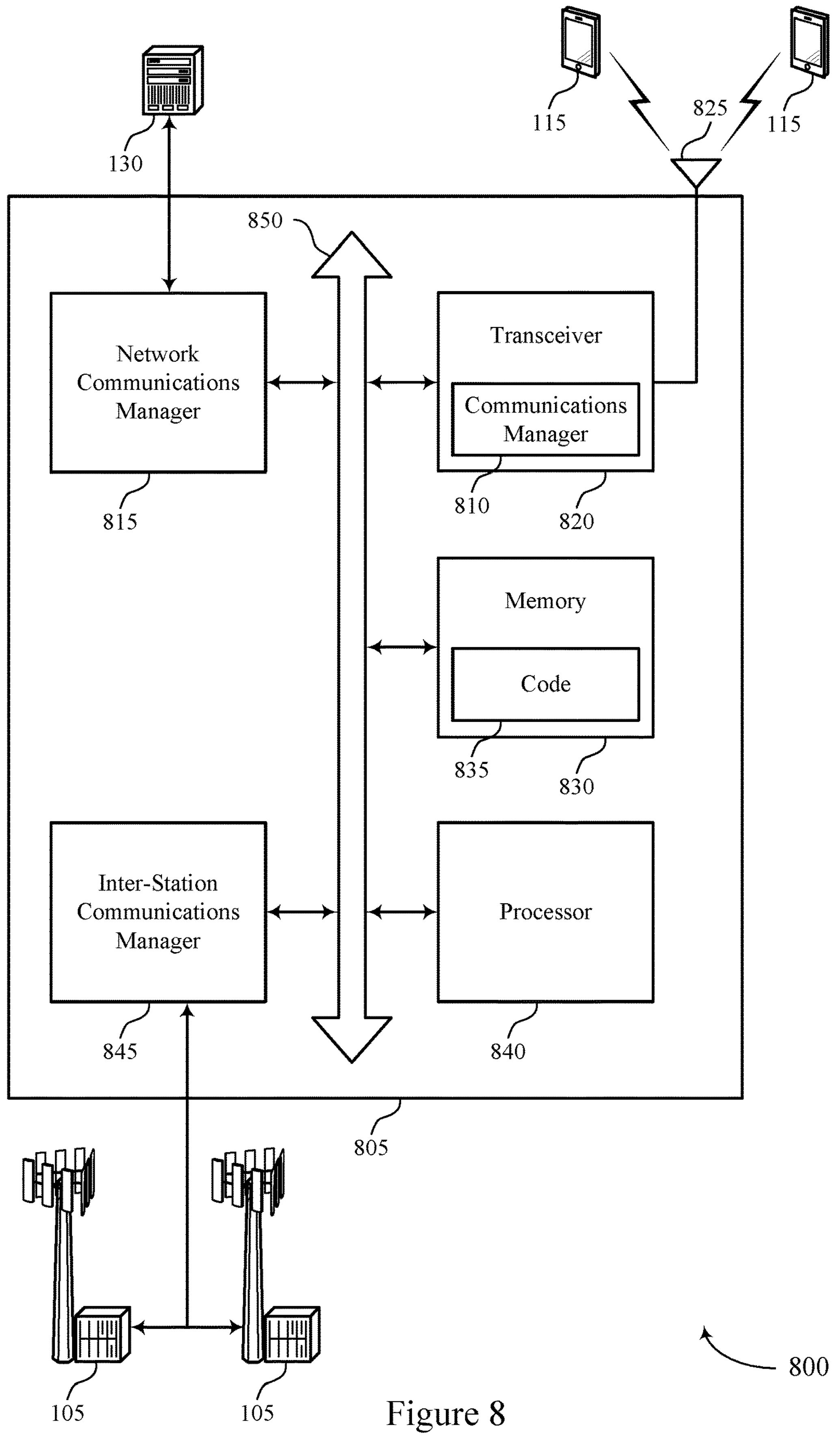

FIG. 8 shows a block diagram 800 of an example device 805 that supports CSI-RS resource activation or deactivation within a resource set. The device 805 may be an example of or include the components of a BS 105 or a set of interconnected BSs 105 for a network. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (such as a bus 850).

In some implementations, the communications manager 810 may transmit, to a UE, a configuration including one or more CSI measurement resources each of the one or more CSI measurement resources having an activity status. The communications manager 810 may transmit, to the UE, control signaling including an indication to switch the activity status of the one or more CSI measurement resources and receive, in response to the control signaling, a report based on a measured channel state or a measured channel interference, or both, according to the activity status of each of the one or more CSI measurement resources.

The network communications manager 815 may manage communications with the core network 130 (for example, via one or more wired backhaul links). The network communications manager 815 may manage the transfer of data communications for client devices, such as one or more UEs 115.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 also may include a modem to modulate the packets and provide the modulated packets to the antennas for transmission, and to demodulate packets received from the antennas.

In some examples, the wireless device may include a single antenna 825. However, in some other examples the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor 840, cause the device to perform various functions described herein. In some examples, the memory 830 may contain, among other things, a BIOS which may control basic hardware or software operation such as the interaction with peripheral components or devices.

The processor 840 may include an intelligent hardware device (for example, a general-purpose processor, a DSP, a central processing unit, a microcontroller, an ASIC, an FPGA, a programmable logic device, a discrete gate or transistor logic component, a discrete hardware component, or any combination thereof). In some implementations, the processor 840 may be configured to operate a memory array using a memory controller. In some examples, a memory controller may be integrated into processor 840. The processor 840 may be configured to execute computer-readable instructions stored in the memory 830 to cause the device 805 to perform various functions, such as functions or tasks supporting CSI-RS resource activation or deactivation within a resource set.

The inter-station communications manager 845 may manage communications with other BS 105 and may include a controller or scheduler for controlling communications with UEs 115 in cooperation with other BSs 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between BSs 105.

The code 835 may include instructions to implement aspects of the present disclosure, including instructions to support wireless communications. The code 835 may be stored in a non-transitory computer-readable medium such as system memory or other type of memory. In some examples, the code 835 may not be directly executable by the processor 840 but may cause a computer, when compiled and executed, to perform functions described herein.

In some implementations, processor 840 may be a component of a processing system. A processing system may generally refer to a system or series of machines or components that receives inputs and processes the inputs to produce a set of outputs (which may be passed to other systems or components of, for example, the BS 115). For example, a processing system of the BS 115 may refer to a system including the various other components or subcomponents of the BS 115.

The processing system of the BS 115 may interface with other components of the BS 110, and may process information received from other components (such as inputs or signals), output information to other components, etc. For example, a chip or modem of the BS 115 may include a processing system, a first interface to receive or obtain information, and a second interface to output, transmit or provide information. In some cases, the first interface may refer to an interface between the processing system of the chip or modem and a receiver, such that the BS 115 may receive information or signal inputs, and the information may be passed to the processing system. In some cases, the second interface may refer to an interface between the processing system of the chip or modem and a transmitter, such that the BS 115 may transmit information output from the chip or modem. A person having ordinary skill in the art will readily recognize that the second interface also may obtain or receive information or signal inputs, and the first interface also may output, transmit or provide information.

Figure 9:
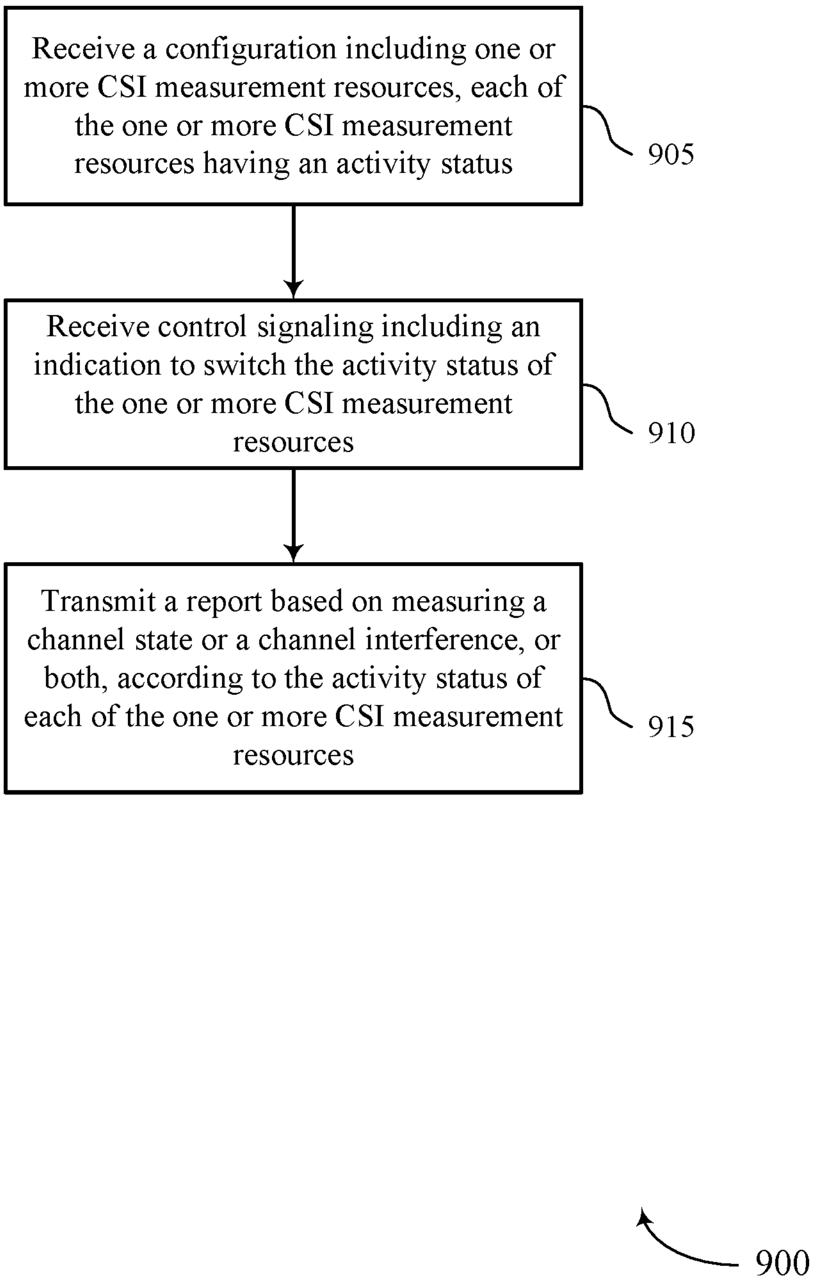
FIGS. 9-12 show flowcharts illustrating methods that support CSI-RS resource activation or deactivation within a resource set.

FIG. 9 shows a flowchart illustrating a method 900 that supports CSI-RS resource activation or deactivation within a resource set. The operations of method 900 may be implemented by a UE 115 or its components as described herein. For example, the operations of method 900 may be performed by a communications manager as described with reference to FIG. 7. In some examples, a UE may execute a set of instructions to control the functional elements of the UE to perform the functions described below. Additionally, or alternatively, a UE may perform aspects of the functions described below using special-purpose hardware.

At 905, the UE may receive a configuration including one or more CSI measurement resources, each of the one or more CSI measurement resources having an activity status. The operations of 905 may be performed according to the methods described herein. In some examples, aspects of the operations of 905 may be performed by a CSI report configuration component.

At 910, the UE may receive control signaling including an indication to switch the activity status of the one or more CSI measurement resources. The operations of 910 may be performed according to the methods described herein. In some examples, aspects of the operations of 910 may be performed by an activity status component.

At 915, the UE may transmit a report based on measuring a channel state or a channel interference, or both, according to the activity status of each of the one or more CSI measurement resources. The operations of 915 may be performed according to the methods described herein. In some examples, aspects of the operations of 915 may be performed by a CSI report component.

Figure 10:
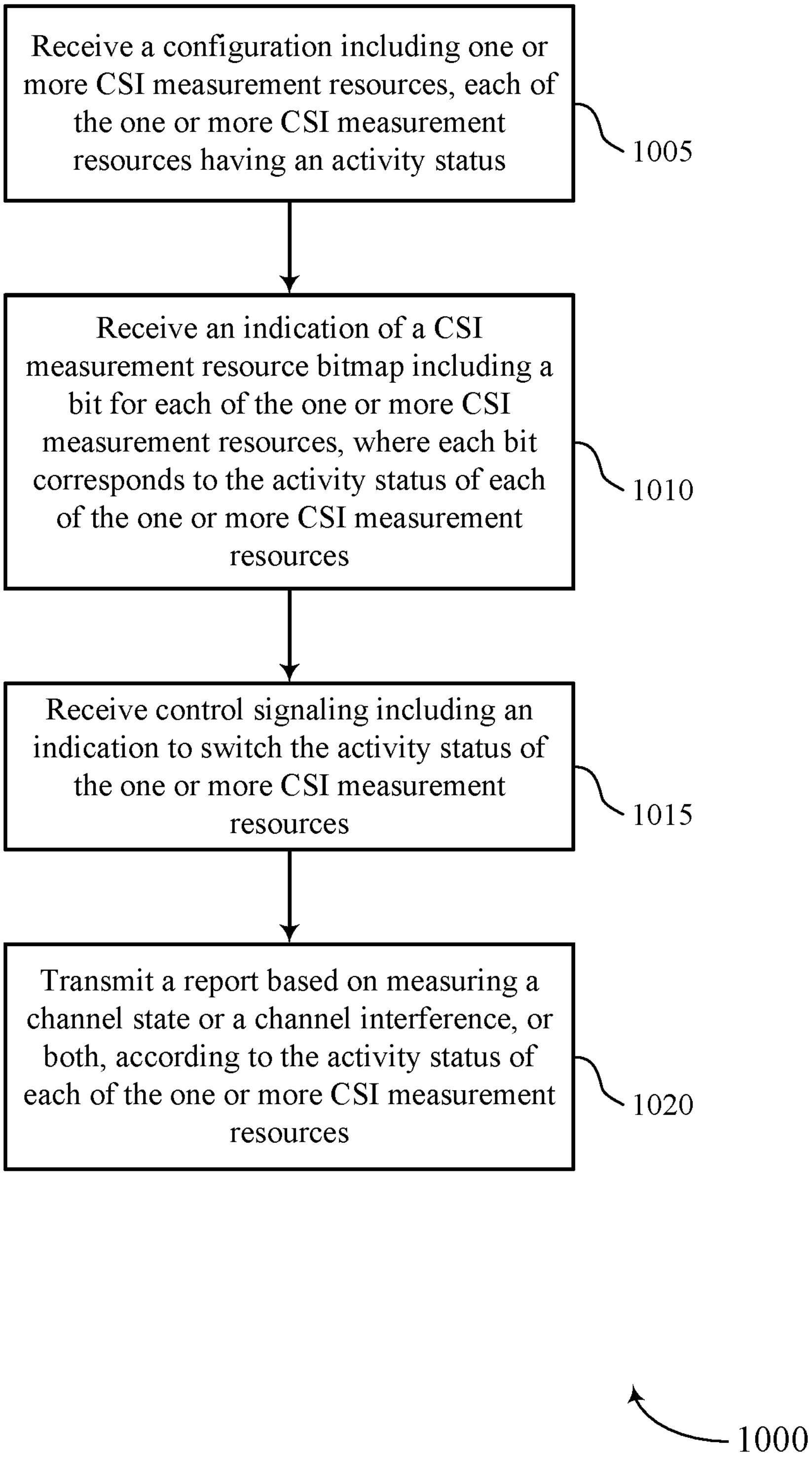

FIG. 10 shows a flowchart illustrating a method 1000 that supports CSI-RS resource activation or deactivation within a resource set. The operations of method 1000 may be implemented by a UE 115 or its components as described herein. For example, the operations of method 1000 may be performed by a communications manager as described with reference to FIG. 7. In some examples, a UE may execute a set of instructions to control the functional elements of the UE to perform the functions described below. Additionally, or alternatively, a UE may perform aspects of the functions described below using special-purpose hardware.

At 1005, the UE may receive a configuration including one or more CSI measurement resources, each of the one or more CSI measurement resources having an activity status. The operations of 1005 may be performed according to the methods described herein. In some examples, aspects of the operations of 1005 may be performed by a CSI report configuration component.

At 1010, the UE may receive an indication of a CSI measurement resource bitmap including a bit for each of the one or more CSI measurement resources, where each bit corresponds to the activity status of each of the one or more CSI measurement resources. The operations of 1010 may be performed according to the methods described herein. In some examples, aspects of the operations of 1010 may be performed by a CSI report configuration component.

At 1015, the UE may receive control signaling including an indication to switch the activity status of the one or more CSI measurement resources. The operations of 1015 may be performed according to the methods described herein. In some examples, aspects of the operations of 1015 may be performed by an activity status component.

At 1020, the UE may transmit a report based on measuring a channel state or a channel interference, or both, according to the activity status of each of the one or more CSI measurement resources. The operations of 1020 may be performed according to the methods described herein. In some examples, aspects of the operations of 1020 may be performed by a CSI report component.

Figure 11:
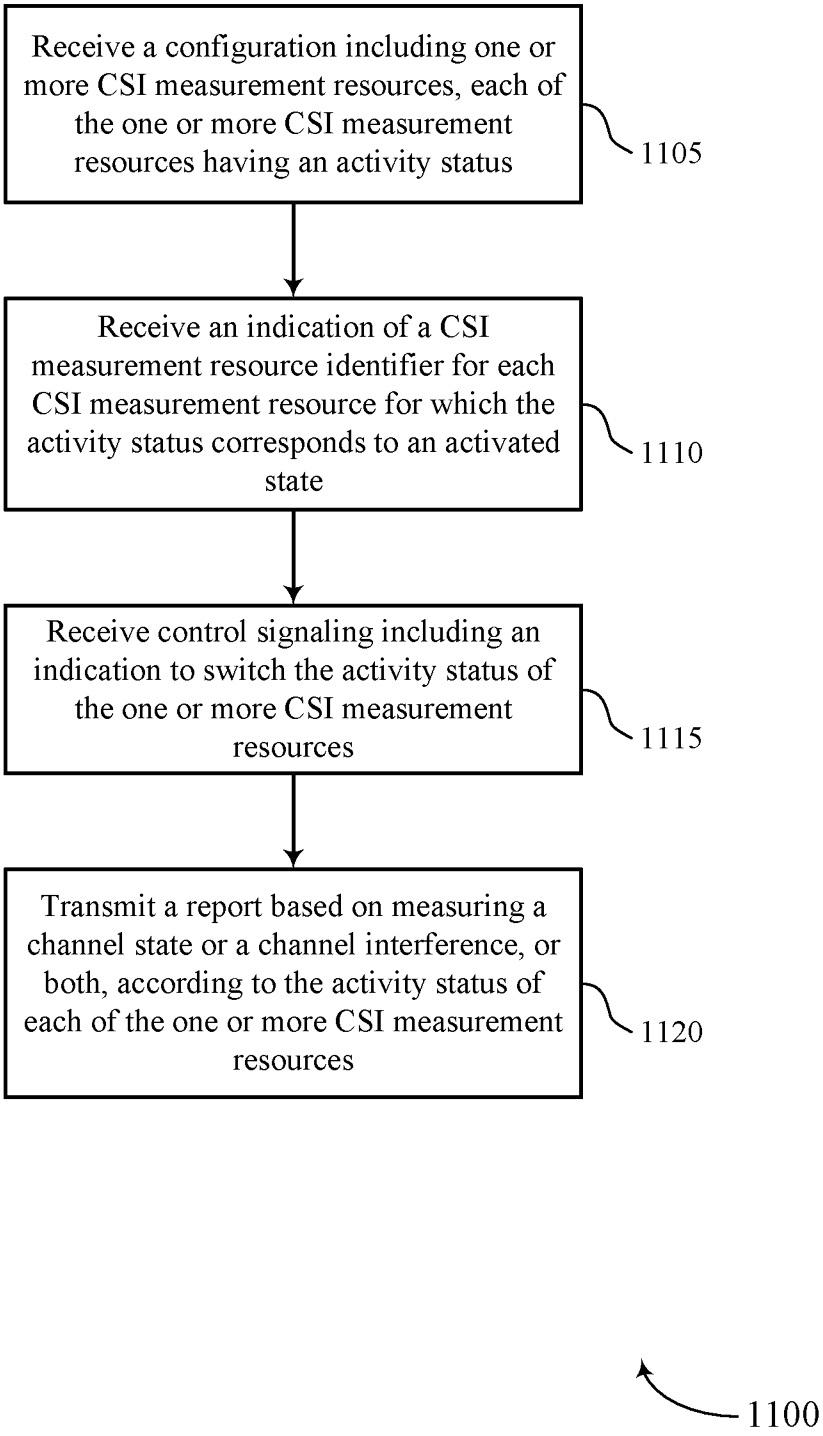

FIG. 11 shows a flowchart illustrating a method 1100 that supports CSI-RS resource activation or deactivation within a resource set. The operations of method 1100 may be implemented by a UE 115 or its components as described herein. For example, the operations of method 1100 may be performed by a communications manager as described with reference to FIG. 7. In some examples, a UE may execute a set of instructions to control the functional elements of the UE to perform the functions described below. Additionally, or alternatively, a UE may perform aspects of the functions described below using special-purpose hardware.

At 1105, the UE may receive a configuration including one or more CSI measurement resources, each of the one or more CSI measurement resources having an activity status. The operations of 1105 may be performed according to the methods described herein. In some examples, aspects of the operations of 1105 may be performed by a CSI report configuration component.

At 1110, the UE may receive an indication of a CSI measurement resource identifier for each CSI measurement resource for which the activity status corresponds to an activated state. The operations of 1110 may be performed according to the methods described herein. In some examples, aspects of the operations of 1110 may be performed by a CSI report configuration component.

At 1115, the UE may receive control signaling including an indication to switch the activity status of the one or more CSI measurement resources. The operations of 1115 may be performed according to the methods described herein. In some examples, aspects of the operations of 1115 may be performed by an activity status component.

At 1120, the UE may transmit a report based on measuring a channel state or a channel interference, or both, according to the activity status of each of the one or more CSI measurement resources. The operations of 1120 may be performed according to the methods described herein. In some examples, aspects of the operations of 1120 may be performed by a CSI report component.

Figure 12:
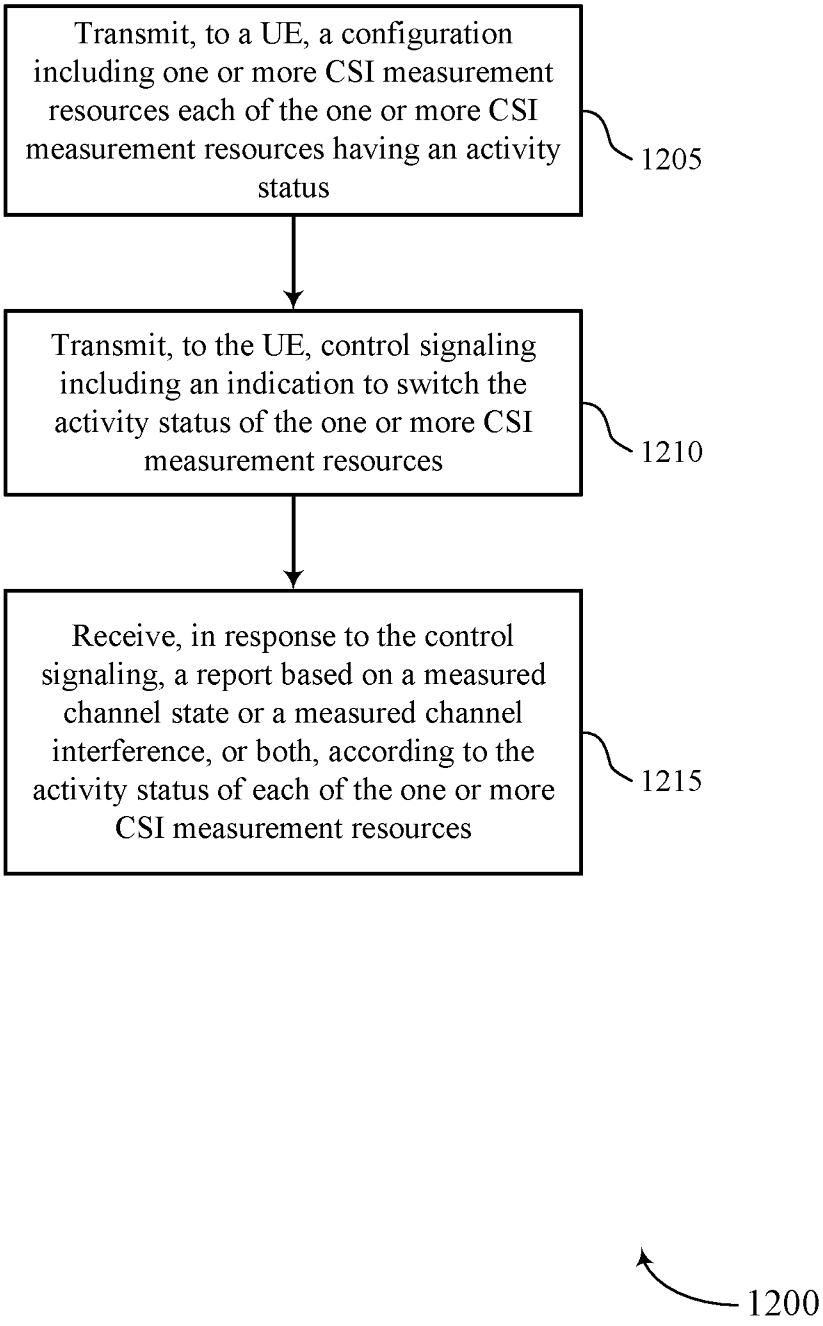

FIG. 12 shows a flowchart illustrating a method 1200 that supports CSI-RS resource activation or deactivation within a resource set. The operations of method 1200 may be implemented by a BS 105 or its components as described herein. For example, the operations of method 1200 may be performed by a communications manager as described with reference to FIG. 8. In some examples, a BS may execute a set of instructions to control the functional elements of the BS to perform the functions described below. Additionally, or alternatively, a BS may perform aspects of the functions described below using special-purpose hardware.

At 1205, the BS may transmit, to a UE, a configuration including one or more CSI measurement resources each of the one or more CSI measurement resources having an activity status. The operations of 1205 may be performed according to the methods described herein. In some examples, aspects of the operations of 1205 may be performed by a CSI report configuration component.

At 1210, the BS may transmit, to the UE, control signaling including an indication to switch the activity status of the one or more CSI measurement resources. The operations of 1210 may be performed according to the methods described herein. In some examples, aspects of the operations of 1210 may be performed by an activity status component.

At 1215, the BS may receive, in response to the control signaling, a report based on a measured channel state or a measured channel interference, or both, according to the activity status of each of the one or more CSI measurement resources. The operations of 1215 may be performed according to the methods described herein. In some examples, aspects of the operations of 1215 may be performed by a CSI report component.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communications at an apparatus of a user equipment (UE), comprising:

receiving a configuration including one or more channel state information (CSI) measurement resources, each of the one or more CSI measurement resources having an activity status;

receiving control signaling comprising an indication to switch the activity status of the one or more CSI measurement resources;

transmitting a report based at least in part on measuring a channel state or a channel interference, or both, according to the activity status of each of the one or more CSI measurement resources;

switching the activity status of the one or more CSI measurement resources based at least in part on the control signaling;

monitoring for one or more CSI-reference signal (CSI-RS) transmissions within a time period between switching the activity status of the one or more CSI measurement resources and a CSI reference resource; and selectively transmitting a second report based at least in part on the monitoring for the one or more CSI-RS transmissions.

2. The method of claim 1, wherein receiving the control signaling comprises:

receiving an indication of a CSI measurement resource bitmap comprising a bit for each of the one or more CSI measurement resources, wherein each bit corresponds to the activity status of each of the one or more CSI measurement resources.

3. The method of claim 1, wherein receiving the control signaling comprises:

receiving an indication of a CSI measurement resource identifier for each CSI measurement resource for which the activity status corresponds to an activated state.

4. The method of claim 1, further comprising:

receiving the one or more CSI-RS transmissions during the time period; and transmitting the second report based at least in part on receiving the one or more CSI-RS transmissions.

5. The method of claim 1, further comprising:

dropping a transmission of the second report based at least in part on a failure to receive the one or more CSI-RS transmissions during the time period.

6. The method of claim 1, further comprising:

transmitting the second report based at least in part on one or more previous CSI measurement resources and a failure to receive the one or more CSI-RS transmissions during the time period.

7. The method of claim 1, further comprising:

determining a number of CSI processing units (CPUs), or a number of active CSI measurement resources, or a number of active CSI measurement ports, or a combination thereof, associated with the one or more CSI measurement resources for which the activity status corresponds to an activated state satisfy a threshold; and evaluating one or more CSI hypotheses of a set of CSI hypotheses corresponding to the one or more CSI measurement resources for which the activity status corresponds to an activated state based at least in part on the number of CPUs satisfying the threshold, or the number of active CSI measurement resources satisfying the threshold, or the number of active CSI measurement ports satisfying the threshold, or a combination thereof.

8. The method of claim 7, further comprising:

switching the activity status of a first portion of the one or more CSI measurement resources from an activated state to a deactivated state; and determining the number of CPUs, or the number of active CSI measurement resources, or the number of active CSI measurement ports, or a combination thereof based at least on a second portion of the one or more CSI measurement resources, wherein the first portion of the one or more CSI measurement resources is different from the second portion of the one or more CSI measurement resources.

9. The method of claim 1, further comprising:

switching the activity status of the one or more CSI measurement resources based at least in part on the control signaling.

10. The method of claim 9, further comprising:

switching the activity status of the one or more CSI measurement resources from one of an activated state or a deactivated state to the other activated state or the deactivated state according to the indication.

11. The method of claim 9, further comprising:

switching the activity status of one or more CSI-interference measurement (CSI-IM) resources based at least in part on switching the activity status of one or more non-zero power (NZP) CSI measurement resources.

12. The method of claim 9, further comprising:

switching the activity status of the one or more CSI measurement resources associated with a second set of CSI measurements resources based at least in part on the indication.

13. The method of claim 9, further comprising:

switching the activity status of one or more CSI measurement resources based at least in part on a number of activated port groups and the indication.

14. The method of claim 9, further comprising:

switching the activity status of a pair of CSI measurement resources based at least in part on the indication.

15. A method for wireless communications at an apparatus of a base station (BS), comprising:

transmitting, to a user equipment (UE), a configuration including one or more channel state information (CSI) measurement resources, each of the one or more CSI measurement resources having an activity status;

transmitting, to the UE, control signaling comprising an indication to switch the activity status of the one or more CSI measurement resources;

receiving, in response to the control signaling, a report based at least in part on a measured channel state or a measured channel interference, or both, according to the activity status of each of the one or more CSI measurement resources;

transmitting second control signaling comprising a second indication to switch the activity status of a second one or more CSI measurement resources associated with a set of CSI hypotheses;

transmitting a CSI-reference signal (CSI-RS) transmission during the second one or more CSI measurement resources; and receiving a second report based at least in part on transmitting the CSI-RS transmission.

16. The method of claim 15, wherein transmitting the control signaling comprises:

transmitting an indication of a CSI measurement resource bitmap comprising a bit for each of the one or more CSI measurement resources, wherein each bit corresponds to the activity status of each of the one or more CSI measurement resources.

17. The method of claim 15, wherein transmitting the control signaling comprises:

transmitting an indication of a CSI measurement resource identifier for each CSI measurement resource for which the activity status corresponds to an activated state.

18. An apparatus for wireless communications, comprising:

a first interface configured to:

obtain a configuration including one or more channel state information (CSI) measurement resources, each of the one or more CSI measurement resources having an activity status; and obtain control signaling comprising an indication to switch the activity status of the one or more CSI measurement resources;

a processing system configured to:

switch the activity status of the one or more CSI measurement resources based at least in part on the control signaling; and monitor for one or more CSI-reference signal (CSI-RS) transmissions within a time period between switching the activity status of the one or more CSI measurement resources and a CSI reference resource; and wherein the first interface or a second interface is configured to:

output a report based at least in part on measuring a channel state or a channel interference, or both, according to the activity status of each of the one or more CSI measurement resources; and selectively output a second report based at least in part on the monitoring for the one or more CSI-RS transmissions.

19. The apparatus of claim 18, wherein the first interface or the second interface is further configured to:

obtain an indication of a CSI measurement resource bitmap comprising a bit for each of the one or more CSI measurement resources, wherein each bit corresponds to the activity status of each of the one or more CSI measurement resources.

20. The apparatus of claim 18, wherein the first interface or the second interface is further configured to:

obtain an indication of a CSI measurement resource identifier for each CSI measurement resource for which the activity status corresponds to an activated state.

21. The apparatus of claim 18, wherein:

the first interface or the second interface is further configured to:

obtain the one or more CSI-RS transmissions during the time period; and the first interface or the second interface is further configured to:

output the second report based at least in part on obtaining the one or more CSI-RS transmissions.

22. The apparatus of claim 18, wherein the processing system is further configured to:

drop an output of the second report based at least in part on a failure to obtain the one or more CSI-RS transmissions during the time period.

23. The apparatus of claim 18, wherein the first interface or the second interface is further configured to:

output the second report based at least in part on one or more previous CSI measurement resources and a failure to obtain the CSI-RS transmission during the time period.

24. The apparatus of claim 18, wherein the processing system is configured to:

determine a number of CSI processing units (CPUs) or a number of active CSI measurement resources, or a number of active CSI measurement ports, or a combination, associated with the one or more CSI measurement resources for which the activity status corresponds to an activated state satisfy a threshold; and evaluate one or more CSI hypotheses of a set of CSI hypotheses corresponding to the one or more CSI measurement resources for which the activity status corresponds to an activated state based at least in part on the number of CPUs satisfying the threshold, or the number of active CSI measurement resources satisfying the threshold, or the number of active CSI measurement ports satisfying the threshold, or a combination.

25. The apparatus of claim 24, wherein the processing system is configured to:

switch the activity status of a first portion of the one or more CSI measurement resources from an activated state to a deactivated state; and determine the number of CPUs, or the number of active CSI measurement resources, or the number of active CSI measurement ports, or a combination thereof based at least on a second portion of the one or more CSI measurement resources, wherein the first portion of the one or more CSI measurement resources is different from the second portion of the one or more CSI measurement resources.

26. The apparatus of claim 18, wherein the processing system is configured to:

switch the activity status of the one or more CSI measurement resources based at least in part on the control signaling.

27. The apparatus of claim 26, wherein the processing system is configured to:

switch the activity status of the one or more CSI measurement resources from one of an activated state or a deactivated state to the other activated state or the deactivated state according to the indication.

28. The apparatus of claim 26, wherein the processing system is further configured to:

switch the activity status of one or more CSI-interference measurement (CSI-IM) resources based at least in part on switching the activity status of one or more non-zero power (NZP) CSI measurement resources.

29. The apparatus of claim 26, wherein the processing system is further configured to:

switch the activity status of the one or more CSI measurement resources associated with a second set of CSI measurements resources based at least in part on the indication.

30. The apparatus of claim 26, wherein the processing system is further configured to:

switch the activity status of one or more CSI measurement resources based at least in part on a number of activated port groups and the indication.

31. An apparatus for wireless communications, comprising:

a first interface configured to:

output, to a user equipment (UE), a configuration including one or more channel state information (CSI) measurement resources each of the one or more CSI measurement resources having an activity status;

output, to the UE, control signaling comprising an indication to switch the activity status of the one or more CSI measurement resources;

output second control signaling comprising a second indication to switch the activity status of a second one or more CSI measurement resources associated with a set of CSI hypotheses; and output a CSI-reference signal (CSI-RS) transmission during the second one or more CSI measurement resources; and wherein the first interface or a second interface is configured to:

obtain, in response to the control signaling, a report based at least in part on a measured channel state or a measured channel interference, or both, according to the activity status of each of the one or more CSI measurement resources; and obtain a second report based at least in part on outputting the CSI-RS transmission.

32. An apparatus for wireless communications at an apparatus of a user equipment (UE), comprising:

means for receiving a configuration including one or more channel state information (CSI) measurement resources, each of the one or more CSI measurement resources having an activity status;

means for receiving control signaling comprising an indication to switch the activity status of the one or more CSI measurement resources;

means for transmitting a report based at least in part on measuring a channel state or a channel interference, or both, according to the activity status of each of the one or more CSI measurement resources;

means for switching the activity status of the one or more CSI measurement resources based at least in part on the control signaling;

means for monitoring for one or more CSI-reference signal (CSI-RS) transmissions within a time period between switching the activity status of the one or more CSI measurement resources and a CSI reference resource; and means for selectively transmitting a second report based at least in part on the monitoring for the one or more CSI-RS transmissions.

* * * * *